US012560177B2

(12) United States Patent
Van Der Walt

(10) Patent No.: US 12,560,177 B2
(45) Date of Patent: Feb. 24, 2026

(54) IMPELLER FOR A DUCT

(71) Applicant: MINETEK INVESTMENTS PTY LTD, New South Wales (AU)

(72) Inventor: Johannes Petrus Van Der Walt, New South Wales (AU)

(73) Assignee: MINETEK INVESTMENTS PTY LTD, New South Wales (AU)

( * ) Notice: Subject to any disclaimer, the term of this patent is extended or adjusted under 35 U.S.C. 154(b) by 23 days.

(21) Appl. No.: 18/686,401

(22) PCT Filed: Aug. 23, 2022

(86) PCT No.: PCT/AU2022/050961
§ 371 (c)(1),
(2) Date: Feb. 23, 2024

(87) PCT Pub. No.: WO2023/023734
PCT Pub. Date: Mar. 2, 2023

(65) Prior Publication Data

US 2025/0250987 A1 Aug. 7, 2025

(30) Foreign Application Priority Data

Aug. 24, 2021 (AU) ................................ 2021221548

(51) Int. Cl.
*F04D 29/38* (2006.01)
*F04D 29/08* (2006.01)
(Continued)

(52) U.S. Cl.
CPC ......... *F04D 29/384* (2013.01); *F04D 29/329* (2013.01); *F04D 29/36* (2013.01);
(Continued)

(58) Field of Classification Search
CPC .... F04D 29/384; F04D 29/386; F04D 25/082; F04D 29/5806; F04D 29/325;
(Continued)

(56) References Cited

U.S. PATENT DOCUMENTS 6,065,937 A 5/2000 Hunt
6,565,334 B1 5/2003 Bradbury
(Continued)

FOREIGN PATENT DOCUMENTS

CN 104389817 A * 3/2015
CN 110259722 A * 9/2019
(Continued)

OTHER PUBLICATIONS

English machine translation of KR-10-2009-0104254-A, Jun. 9, 2025.*

(Continued)

*Primary Examiner* — Christopher Verdier
(74) *Attorney, Agent, or Firm* — William H. Honaker; Dickinson Wright PLLC

(57) ABSTRACT

An impeller (20, 120) for a ducted fan arrangement (10, 110), the impeller (20, 120) including a hub (24, 124) and a plurality of blades (26, 126) extending radially from the hub (24, 124), each of the plurality of blades (26, 126) including a root (28, 128) proximate the hub (24, 124) and a tip (30, 130). A camber of each of the plurality of blades (26, 126) is arranged to flatten or reduce between the root (28, 128) and the tip (30, 130). A fan arrangement (10, 110) including such an impeller (20, 120) is also disclosed.

25 Claims, 22 Drawing Sheets

(51) Int. Cl.
*F04D 29/32* (2006.01)
*F04D 29/36* (2006.01)
*F04D 29/54* (2006.01)

(52) U.S. Cl.
CPC ......... *F04D 29/386* (2013.01); *F04D 29/545* (2013.01); *F04D 29/08* (2013.01); *F04D 29/362* (2013.01); *F04D 29/542* (2013.01); *F05D 2240/301* (2013.01); *F05D 2240/307* (2013.01)

(58) Field of Classification Search
CPC ...... F04D 29/329; F04D 19/002; F04D 29/36; F04D 29/362; F04D 29/542; F04D 29/545; F04D 29/547; F04D 25/08; F05D 2240/301; F05D 2240/307
See application file for complete search history.

(56) References Cited

U.S. PATENT DOCUMENTS

| | | | | |
|---|---|---|---|---|
| 6,722,849 | B1 | 4/2004 | Lievens et al. | |
| 8,337,154 | B2 | 12/2012 | Decker et al. | |
| 9,694,373 | B2 * | 7/2017 | Bird | B05B 7/0075 |
| 2005/0186096 | A1 * | 8/2005 | Vinson | F04D 25/0646 417/423.1 |
| 2020/0157946 | A1 | 5/2020 | Goodhand | |

FOREIGN PATENT DOCUMENTS

| | | | | |
|---|---|---|---|---|
| CN | 111043081 | A | * | 4/2020 |
| JP | 58-66000 | A | * | 4/1983 |
| KR | 10-2009-0104254 | A | * | 10/2009 |
| WO | 2018152577 | A1 | | 8/2018 |

OTHER PUBLICATIONS

English machine translation of JP-58-66000-A, Jun. 9, 2025.*
English machine translation of CN-104389817-A, Jun. 9, 2025.*
English machine translation of CN-110259722-A, Jun. 9, 2025.*

* cited by examiner

IMPELLER FOR A DUCT

RELATED APPLICATIONS

This U.S. National phase application claims priority to PCT International Application No. PCT/AU2022/050961, filed Aug. 23, 2022, which claims priority from Australian patent application no. 2021221548 filed on 24 Aug. 2021, the contents of which are incorporated by reference.

TECHNICAL FIELD

The invention relates to an impeller for a duct and a ducted fan arrangement including an impeller.

BACKGROUND

Ducted fans may be used to provide airflow through a duct or a network of ducts for ventilation purposes or the like. Typically, a ducted fan includes a housing which supports an axially arranged impeller driven by a motor. The impeller includes a plurality of radially extending blades adapted to provide the air flow. The flow conditions in such ducts are typically in the incompressible flow region with Mach numbers less than about 0.3.

Blades of such impellers are typically designed to drive the airflow by focussing either reaction or impulse. A reaction blade is designed to generate air flow as a result of pressure change, and the blades may be aerofoil shaped to create the pressure differential across the blade. An impulse blade is designed to impart momentum to the airflow by the surfaces and the blades may be flat or non-aerofoil shaped to directly impart motion to the airflow.

A problem with reaction blades relates to the ability to efficiently generate flow in high pressure or low flow situations where the blades may stall. Impulse blades, in contrast, may offer improved efficiency in high pressure or low flow situations. However, a problem with impulse blades is that efficiency may be low in lower pressure or higher flow situations, especially as the rotational speed of the impeller increases.

The invention disclosed herein seeks to provide an improved impeller for a duct which seeks to overcome one or more of the above identified problems or at least provide a useful alternative.

SUMMARY

In accordance with a first broad aspect there is provided, an impeller for a ducted fan arrangement, the impeller including a hub and a plurality of blades extending radially from the hub, each of the plurality of blades including a root proximate the hub and a tip, wherein a camber of each of the plurality of blades is arranged to flatten between the root and the tip.

Characteristics of the plurality of blades may be such that the impeller provides a substantially impulse driven flow toward the hub and transition relatively toward a pressure driven flow toward the tip.

In an aspect, a tip camber at the tip of each of the plurality of blades is at least in the range of about 15 to 50 degrees, and in some examples at least 15 to 30 degrees, less than a root camber at the root of the blade.

In another aspect, a tip camber at the tip of each of the plurality of blades is at least about 25% less than, and in some examples at least about 35% to 60% less than, a root camber at the root of the blade.

In yet another aspect, the tip camber is the range of 25 to 35 degrees and the root camber is in the range of 50 to 60 degrees.

In yet another aspect, the impulse ratio at the tip is less than the impulse ratio at the hub.

In yet another aspect, the impulse ratio at the tip is at least 10% less than the impulse ratio at the hub.

In yet another aspect, the impulse ratio at the hub is greater than about 0.9.

In yet another aspect, the impulse ratio at the tip is less than 0.85.

In yet another aspect, the solidity of the impeller decreases between the hub and the tip from a solidity greater than about 1.75 at the hub to a solidity less than about 1.7 and in some examples less than about 1.5 at the tip.

In yet another aspect, the solidity of the impeller deceases between the hub and the tip from a solidity greater than about 1.75, and in some examples greater than about 2 at the hub to a solidity less than about 1.5, and in some examples less than about 1.25 at the tip.

In yet another aspect, in some examples a tip solidity of the impeller is about 0.5 to 0.75 of a hub solidity of the impeller. However, the fitted number of blades and angle may be adjusted to change the tip solidity to suit.

In yet another aspect, the stagger angle increases from the hub toward the tip.

In yet another aspect, the stagger angle is at least 20 degrees greater that the tip relative to the root.

In yet another aspect, the hub stagger angle is less than 40 degrees and the tip stagger angle is greater than 50 degrees.

In yet another aspect, each of the plurality of blades is a flat plate or non-aerofoil section.

In yet another aspect, the each of the plurality of blades has at least one of a shape and aerofoil shaped section.

In yet another aspect, wherein each of the plurality of blades is pivotally coupled to the hub.

In yet another aspect, the impeller includes a pitch adjustment mechanism adapted to pivotally couple each of the plurality of blades with the hub.

In yet another aspect, the impeller operates with flows having a Mach number less than about 0.3.

In accordance with a second broad aspect there is provided, a ducted fan arrangement including an impeller as defined above and herein.

In accordance with a third broad aspect there is provided, a ducted fan arrangement including: a duct body with an inlet and an outlet; a motor supported by the duct body; an impeller driven by the motor between the inlet and the outlet; and a diffuser support by the duct body between impeller and the outlet, wherein the impeller includes a hub coupled to the motor and a plurality of blades extending radially from the hub, each of the plurality of blades including a root proximate the hub and a tip, and wherein a camber of each of the plurality of blades is arranged to flatten between the root and the tip to provide an impulse driven flow toward the hub and transition toward a pressure driven flow toward the tip.

In accordance with a fourth broad aspect there is provided, a ducted fan arrangement including: a duct body with an inlet and an outlet; a motor supported by the duct body; an impeller driven by the motor between the inlet and the outlet; and a diffuser support by the duct body between impeller and the outlet, wherein the diffuser includes an elongate substantially moulded body.

In accordance with a fifth broad aspect there is provided, a ducted fan arrangement including: a duct body with an inlet and an outlet; a motor supported by the duct body; an impeller driven by the motor between the inlet and the outlet, the impeller including a hub and a plurality of blades pivotally coupled to and extending from the hub; and a diffuser supported by the duct body between impeller and the outlet, wherein the diffuser includes an elongate substantially moulded body and plurality guide vanes having an aerofoil shape extending between the diffuser and the duct body.

In accordance with a sixth broad aspect there is provided, an impeller for a ducted fan arrangement, the impeller including a hub and a plurality of blades extending radially from the hub, each of the plurality of blades including a root proximate the hub and a tip, wherein a tip camber at the tip of the blade is at least in the range of 15 to 30 degrees less than a root camber at the root of the blade.

In accordance with a seventh broad aspect there is provided, an impeller for a ducted fan arrangement, the impeller including a hub and a plurality of blades extending radially from the hub, each of the plurality of blades including a root proximate the hub and a tip, wherein a tip camber at the tip of the blade is at least 25% less than a root camber at the root of the blade.

In accordance with an eighth broad aspect there is provided, an impeller for a ducted fan arrangement, the impeller including a hub and a plurality of blades extending radially from the hub, each of the plurality of blades including a root proximate the hub and a tip, wherein a camber of each of the plurality of blades is arranged to flatten between the root and the tip.

BRIEF DESCRIPTION OF THE FIGURES

The invention is described, by way of non-limiting example only, by reference to the accompanying figures, in which.

DETAILED DESCRIPTION

Figure 1:
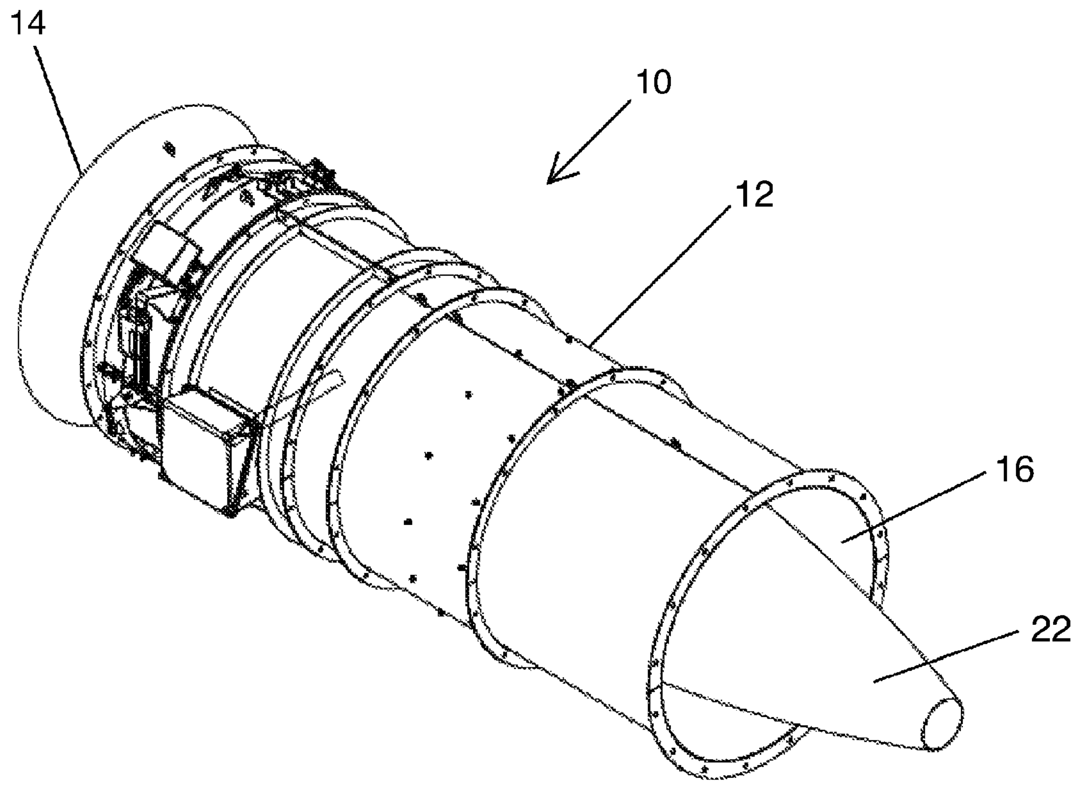
FIG. 1 is a rear perspective view illustrating a first example of a ducted fan arrangement.
Figure 2:
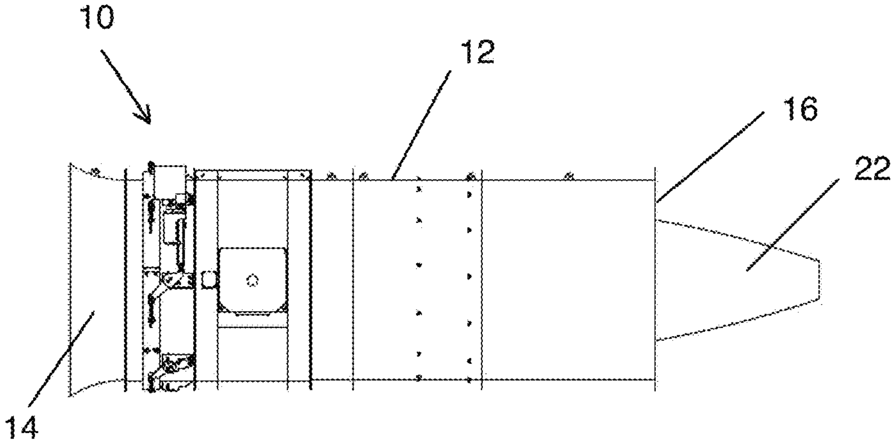
FIG. 2 is a side view illustrating the example of the ducted fan arrangement.
Figure 3:
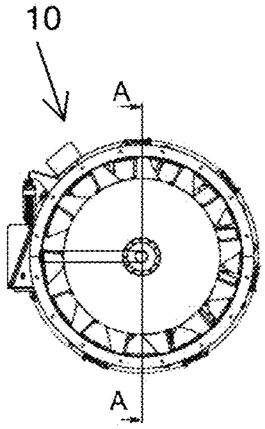
FIG. 3 is a front view illustrating the example of the ducted fan arrangement.

Referring to FIGS. 1 to 5, there is shown a first example of a ducted fan arrangement 10 including a duct body 12 with an inlet 14 and an outlet 16, a motor 18 supported by the duct body 12, an impeller 20, also known as a fan, driven by the motor 18 between the inlet 14 and the outlet 16 and a diffuser 22 supported by the duct body 12 between impeller 20 and the outlet 16. The impeller 20 includes a hub 24 and a plurality of blades 26 extending radially from the hub 24, each of the plurality of blades including a root 28 proximate the hub 24 and a tip 30.

Figure 4:
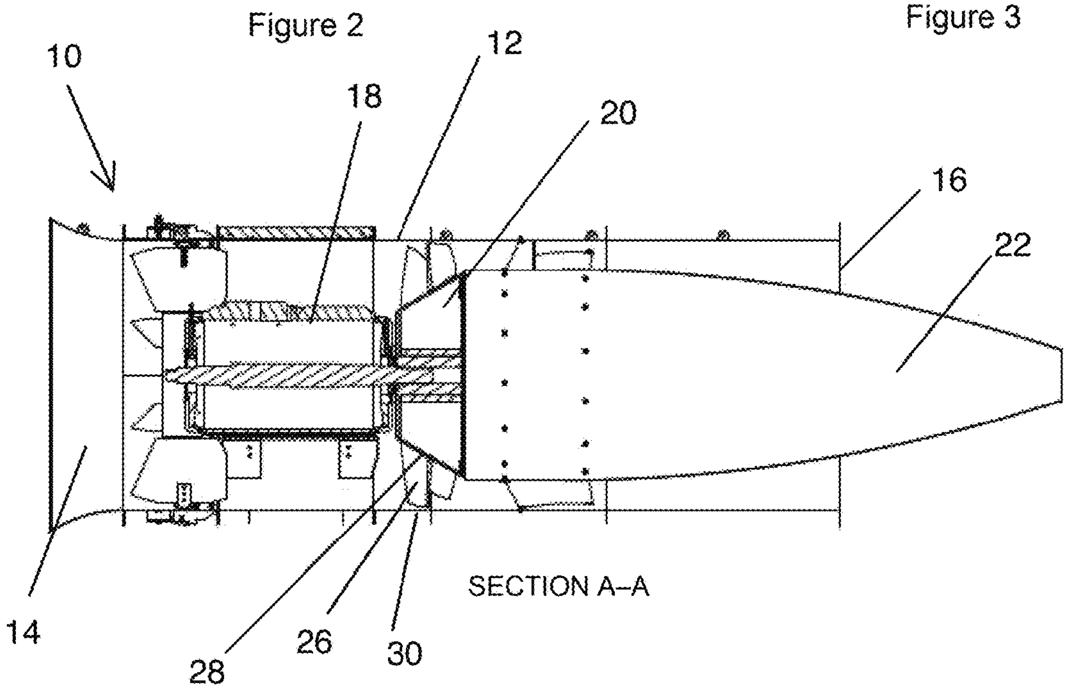
FIG. 4 is a cross sectional view illustrating section A-A of the ducted fan arrangement as indicated in FIG. 3.
Figure 5:
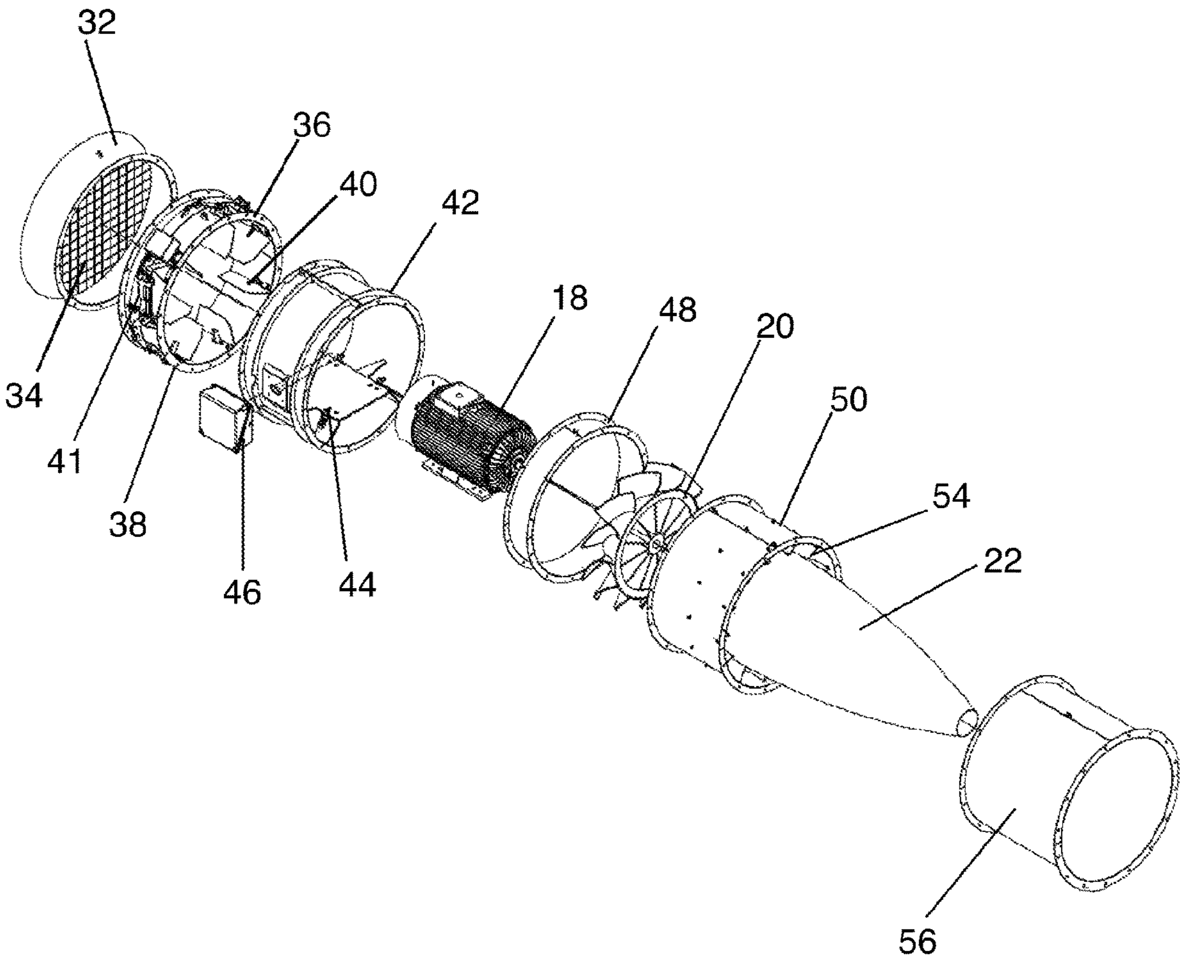
FIG. 5 is an exploded parts view illustrating the ducted fan arrangement.
Figure 6:
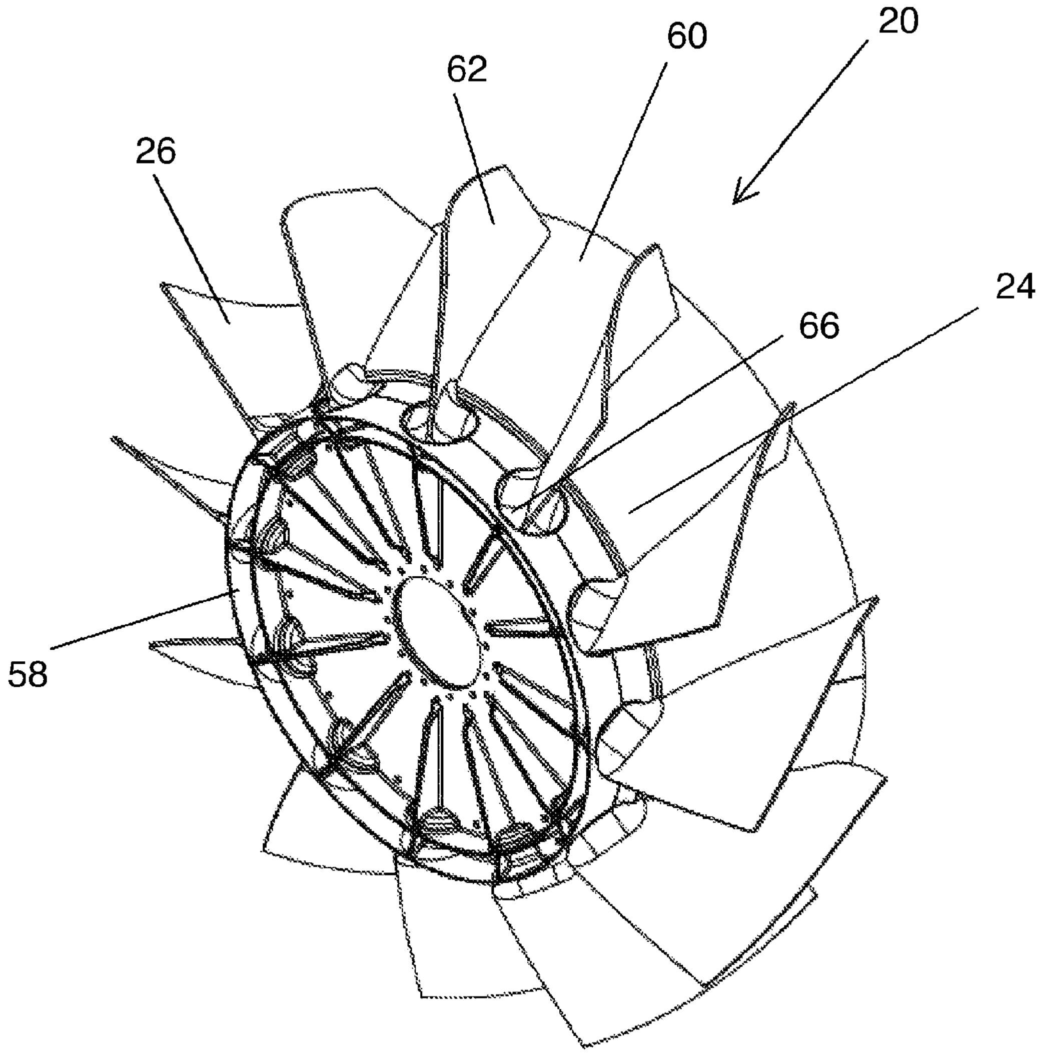
FIG. 6 is a perspective view illustrating an impeller of the ducted fan arrangement.
Figure 7:
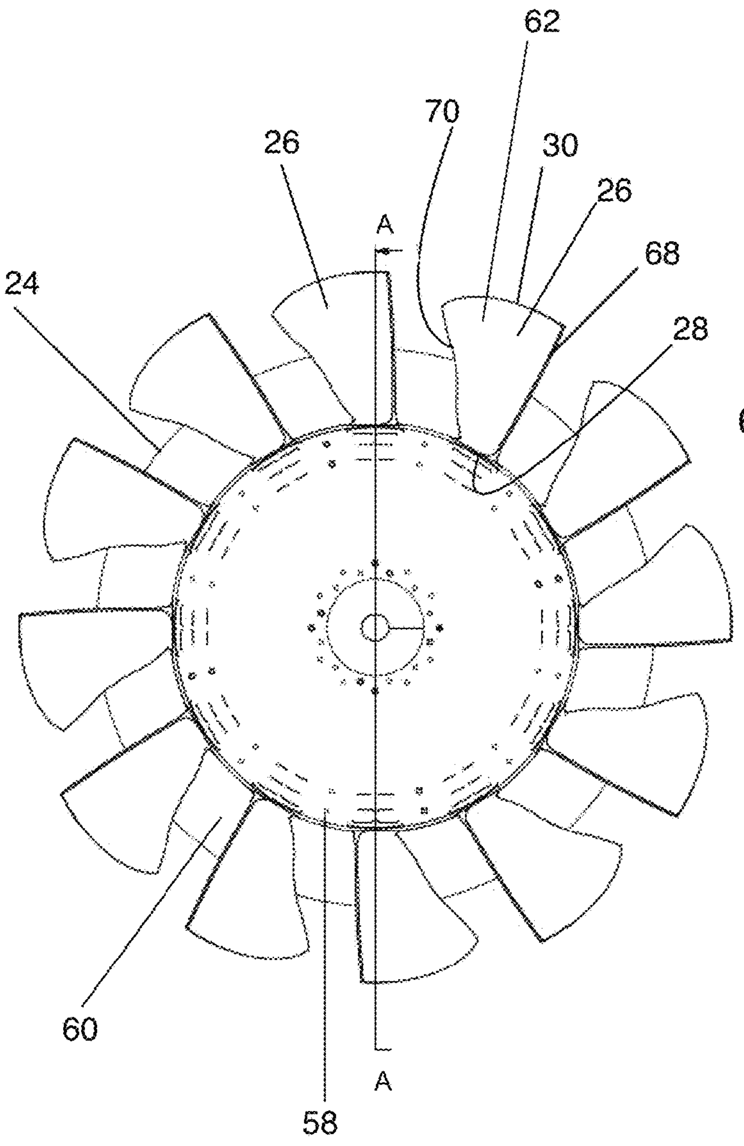
FIG. 7 is a front view illustrating the impeller.

As best shown in FIGS. 4 and 5, the ducted fan arrangement 10 further includes an inlet cowling 32 with a grate 34, a controllable vane assembly 36 including an annular housing 38 and a plurality of controllable inlet vanes 40 that are pivotally controllable by actuators 41 to dampen and/or pre-swirl the flow, an annular motor housing 42 with a motor support 44 and controller 46, an annular impeller housing 48 and a diffuser assembly 50 including an annular diffuser housing 52 with outlet guide vanes 54 arranged to support the diffuser 22 and an annular end section 56.

As may be best appreciated from FIG. 4, air flow is directed from the inlet cowling 32 through the plurality of controllable inlet vanes 40 and through the annular motor housing 42 about the motor 18 which is axially arranged and directly forward of the impeller 20. The hub 24 is directly coupled to the motor 18 such the motor 18 directly drives the impeller 20. The flow is then driven by the impeller 20 and directed or transitioned by the hub 24, which is a tapered hub, to the diffuser assembly 50.

The taper of the hub 24 may be constant and in the range of about 10 to 40 degrees, and preferably, not limited to, about 30 to 35 degrees. The hub taper provides some compression to the airflow and thereby may increase the velocity of the air flow. The flow then proceeds past the outlet vanes 54 to the outlet 16. The diffuser 22 provides a long taper and gradual expansion of the flow. The outlet guide vanes 54 may be aerofoil shaped and the diffuser 22 may be a single piece such as, but not limited to, a plastic rotomolded section.

Referring now to FIGS. 6 to 11, the impeller 20 is shown in more detail. The hub 24 includes a forward hub section 58 to which the plurality of blades 26 are radially coupled and a rear hub section 60 that has a frustoconical shape to provide the taper. The plurality of blades 26 each include blade sections 62 and coupling sections 64 that fit with sockets 66 of the forward hub section 58. The coupling sections 64 may be fitted to the sockets 66 to enable variation of the pitch during installation and then fixed once the pitch is set.

Figure 8:
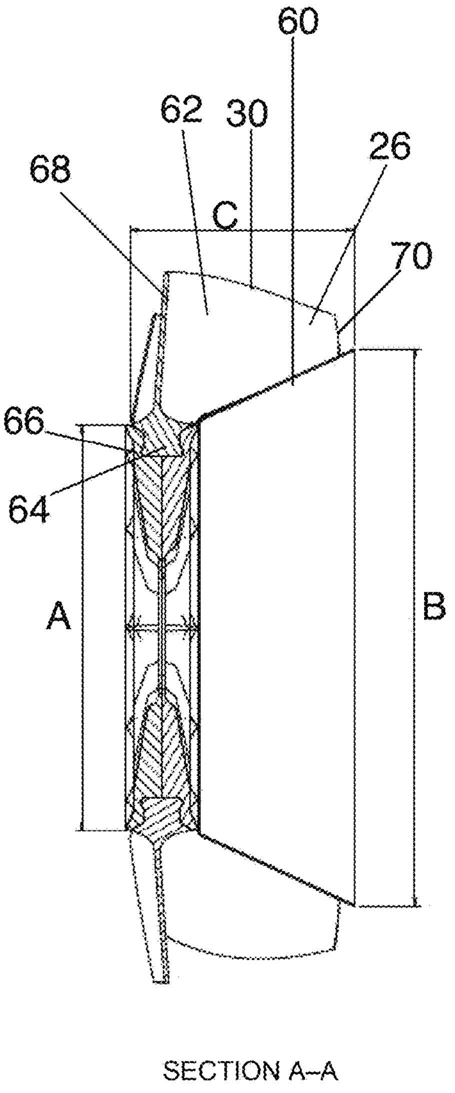
FIG. 8 is a side sectional view illustrating section A-A of the impeller.

Each of the blade sections 62 includes leading edge 68 and trailing edge 70. By way of example only, as shown in FIG. 8 the diameter "A" of the forward hub section 58 may be about 0.6 to 0.8 metres, the diameter "B" of the rear hub section 60 may be about 1 to 1.1 metres and the width "C" is about 0.3 to 0.45 meters. Each of the plurality of blades 26 may include a flat plate or non-aerofoil section, or may be of a simple aerofoil shape such as, but not limited to, a symmetrical air foil.

Figure 9:
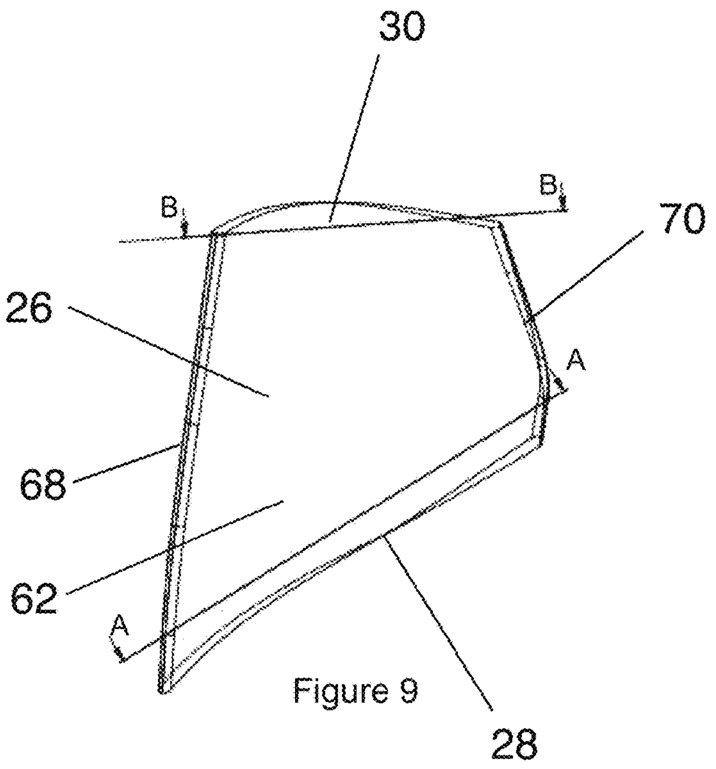
FIG. 9 is a side view illustrating a blade of the impeller.
Figure 10:
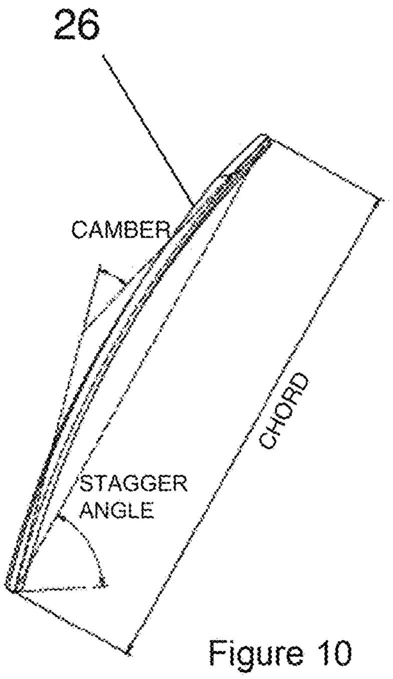
FIG. 10 is a sectional view illustrating section B-B as shown in FIG. 9.
Figure 11:
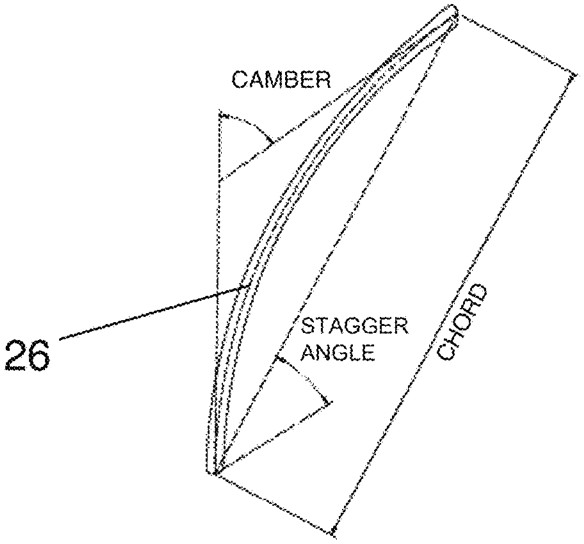
FIG. 11 is a sectional view illustrating section A-A as shown in FIG. 9.
Figure 12:
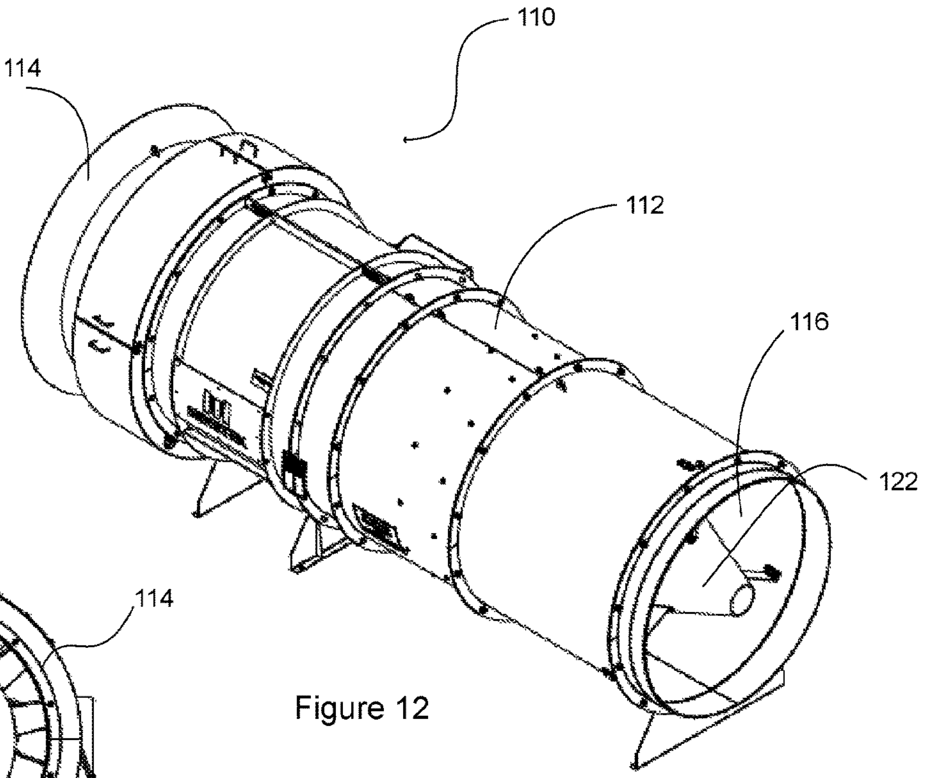
FIG. 12 is a rear perspective view illustrating a second example of the ducted fan arrangement.
Figure 13:
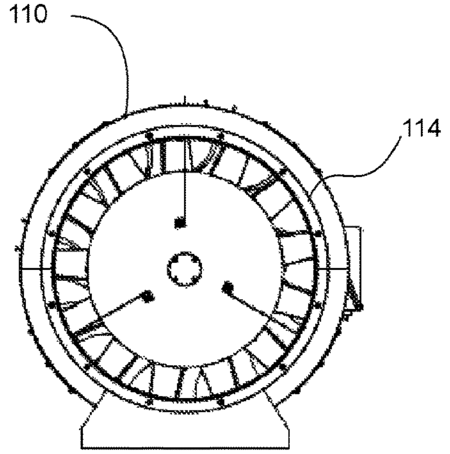
FIG. 13 is a front view illustrating the second example of the ducted fan arrangement.
Figure 14:
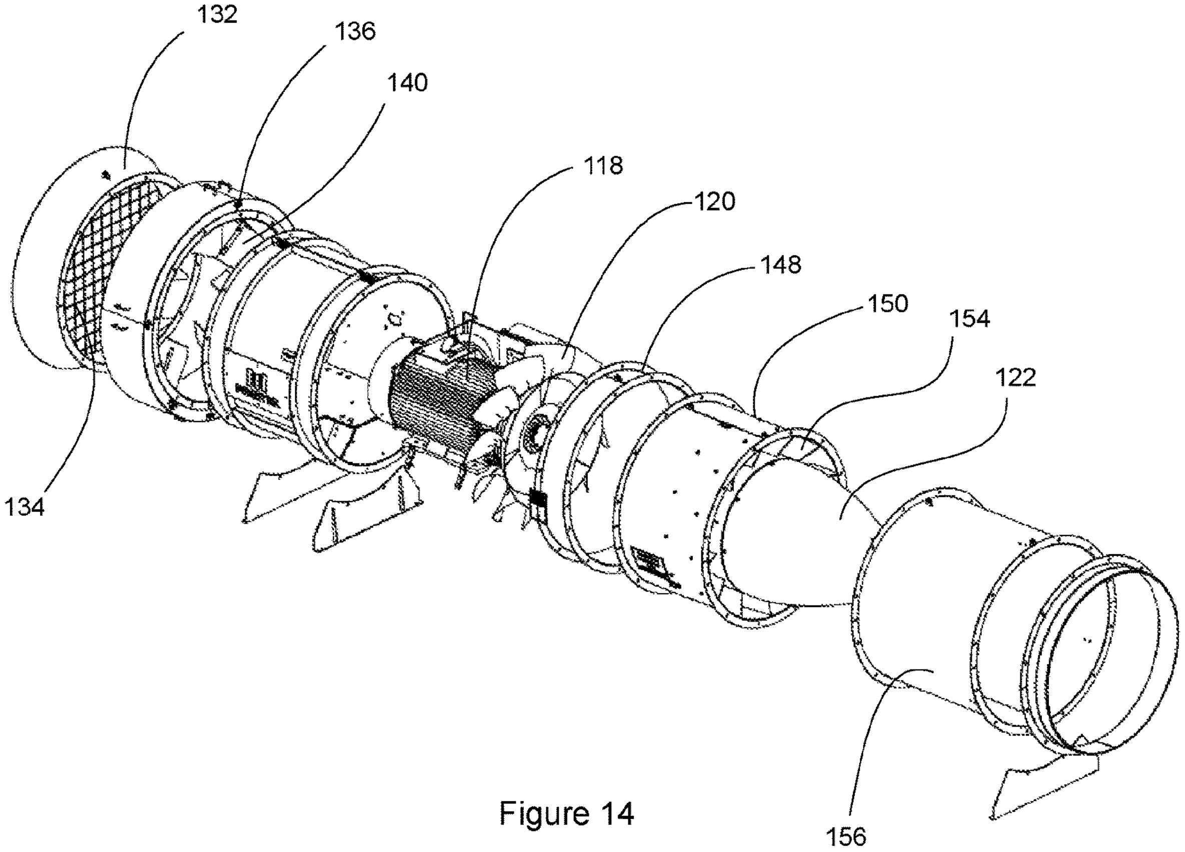
FIG. 14 is a rear perspective exploded parts view illustrating the second example of the ducted fan arrangement.

Turning now to the blades 26 and the characteristics of the blades 26 as shown best in FIGS. 9 to 11, and as detailed in the graphs of FIGS. 22-25, the characteristics of the blades 26 may be defined by camber angle, impulse ratio, solidity, and stagger angle as shown in the graphs of FIGS. 22-25, respectively. For comparative purposes, the characteristics of blades 26 of the present impeller 20 are shown relative to an impulse bladed impeller disclosed in WO/2018/152577 in which the blades are formed of substantially flat plate. This impeller is referred to herein as the "HO" impeller.

As will be further detailed below, a camber of each of the plurality of blades 26 is arranged to flatten between the root 28 and the tip 30 to provide a substantially impulse driven flow toward the hub 24 and transition or blend toward a pressure or reactive driven flow toward the tip 30.

It is noted that the present impeller 20 is designed for operational speeds up to about 1800 RPM (Revolutions per Minute) and for incompressible flow, with Mach numbers in the range of about less than about 0.3. Accordingly, the impeller 20 operational ranges are different to, say, those of jet or high flow turbomachinery that operates at high Mach numbers and in the compressible flow regime.

Figure 22:
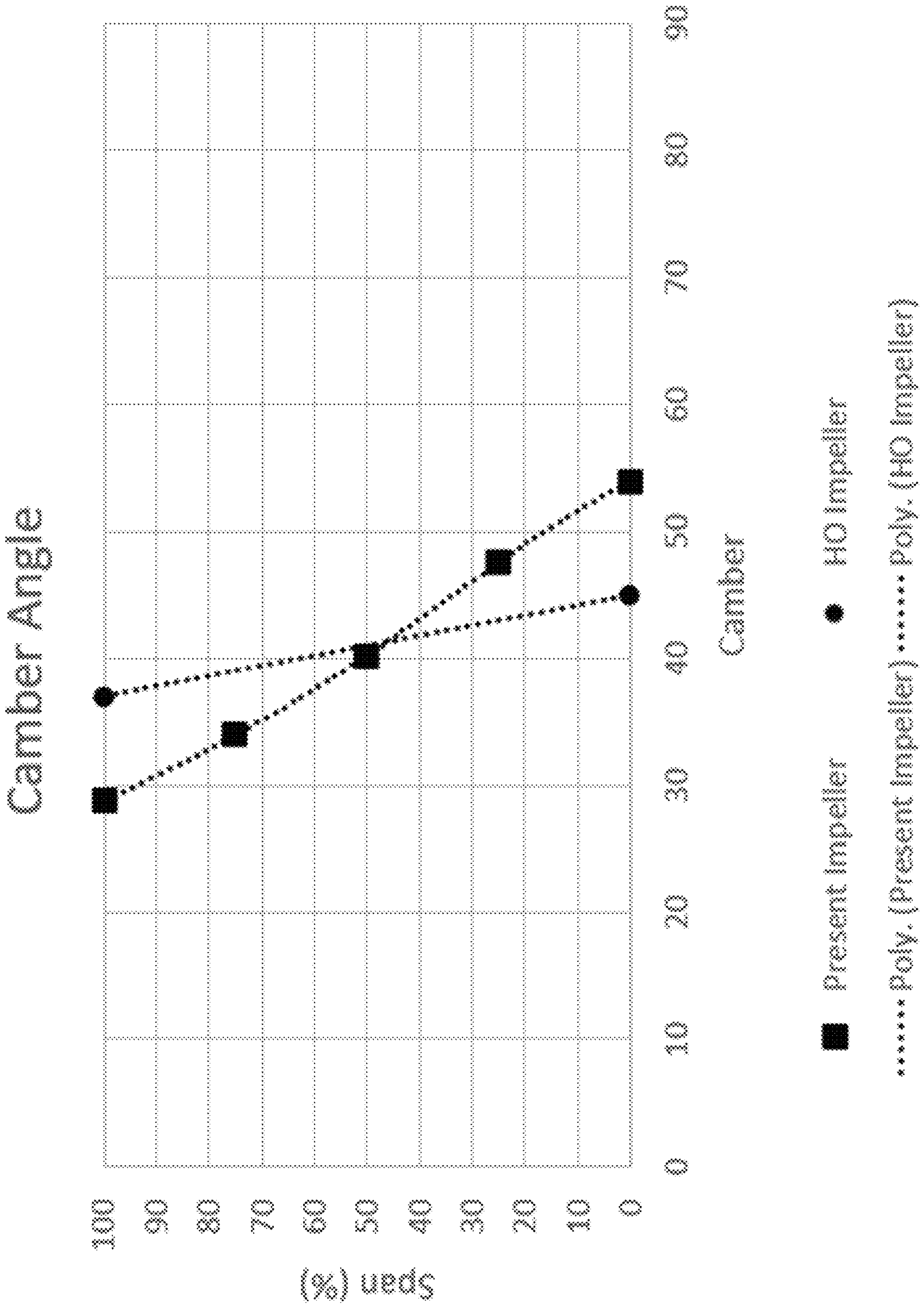
FIG. 22 shows a graph illustrating Blade Span (%) vs. Camber.

Turning firstly to camber and the graph of FIG. 22, the camber is defined is the angle between intersecting tangential lines that extend from each of the leading and trailing edges in which an increase in camber represents an increase in the curvature of the blade. In this example, it may be seen that the camber angle of the present impeller changes between the root and tip so as to become continuously flatter toward the tip. The root camber may be, but not limited to, in the range of about 45 to 80 degrees, and more specifically in the range of about 50 to 60 degrees, and still more specifically may be about 54 degrees as shown in the graph of FIG. 22. The tip camber may be, but not limited to, in the range of about 25 to 45 degrees, and more specifically in the range of about 25 to 35 degrees, and still more specifically may be about 29 degrees as shown in the graph of FIG. 22. This is a much greater change in camber across to the span of the blade in comparison to the HO fan.

In this regard, for example, a tip camber at the tip of each of the plurality of blades may be at least in the range of 15 to 50 degrees less, and in some examples 15 to 30 degrees less, than a root camber at the root. Put another way, a tip camber at the tip of each of the plurality of blades is at least about 25% less, and in some examples 35% to 60% less than a root camber at the root of the blade. This change in camber over the span of the blade changes the characteristics of the impeller from being more impulse functioning at the root and becoming more reactive functioning at the tip.

Figure 23:
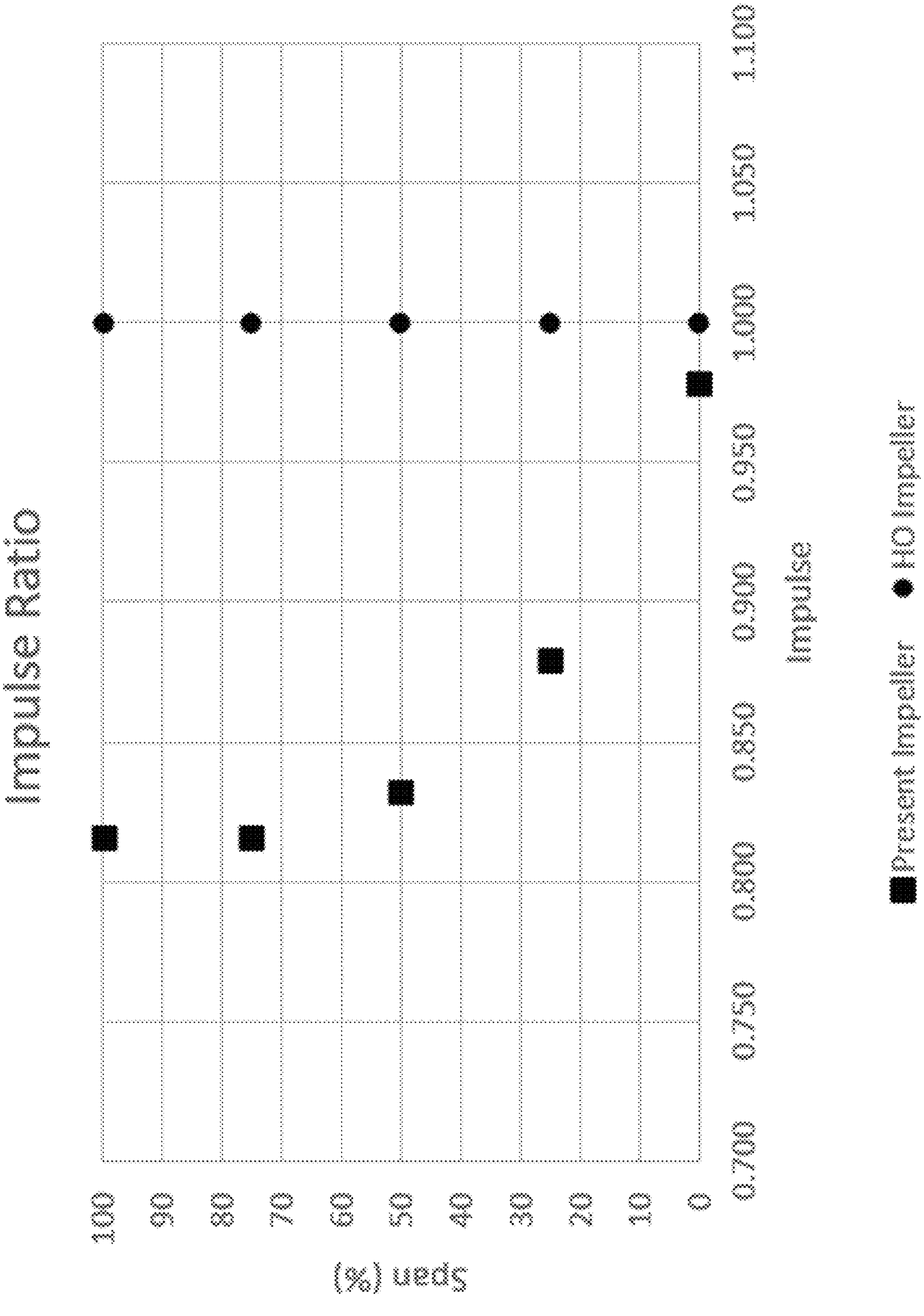
FIG. 23 shows a graph illustrating Blade Span (%) vs.

As such, as shown in the graph of FIG. 23, the impulse ratio of the present impeller decreases toward the tips of the blades. It may be seen from the graph of FIG. 23 that the impulse ratio at the tip is less than the impulse ratio at the hub, the impulse ratio at the tip is at least 10% less than the impulse ratio at the hub, the impulse ratio at the hub is greater than about 0.9, and that the impulse ratio at the tip is less than 0.85. At mid or 50% span, it may be seen that the impulse ratio is between about 0.8 and 0.85 and at 25% span the impulse ratio is between about 0.85 and 0.90.

In contrast, the impulse ratio of the HO impeller is about 1 across the span of the blade. The impulse ratio is a representative ratio where an impulse ratio of "1" indicate an impulse blade and "0" represents a reactive blade. Accordingly, the present impeller may be considered a blended or composite design includes the characteristics of both an impulse bladed fan and a reactive or pressure driven fan.

Figure 24:
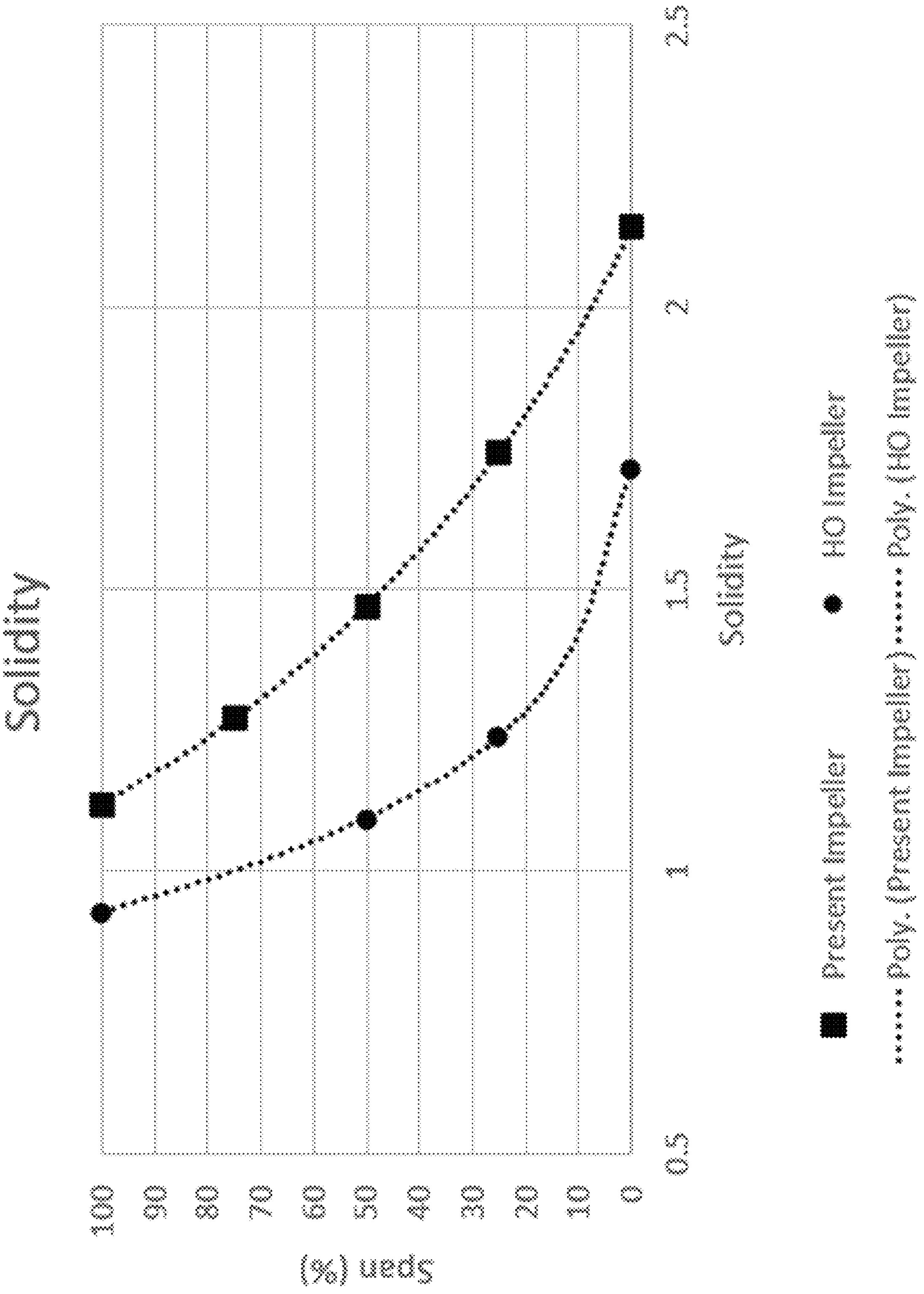
FIG. 24 shows a graph illustrating Blade Span (%) vs. Solidity.

Referring to the graph of FIG. 24, the solidity ratio is shown which is defined as the ratio of effective area (projected area of all the individual blade elements) normal to the flow direction divided by the area through which the air flows at the impeller. In this example, the solidity of the impeller deceases between the hub and the tip from a solidity between about, but not limited to, 1.75 to 2.5 at the hub and between, but not limited to, about 0.8 and 1.7 at the tip. Preferably in this example, the hub solidity is greater than about 1.75-2.0 and the tip solidity may be less an about 1.5-1.7 and preferably less than about 1.5. In this example, the hub solidity may be about 2.2 and the tip solidity is about 1.1.

Accordingly, in this example, the hub solidity is greater than the tip, with the tip solidity being about 50% to 75% of the hub solidity. In comparison, the HO impeller typically has lower solidities as shown in the graph of FIG. 24. However, it is noted that solidity may be adjusted such as by removing or adding blades 26.

Figure 25:
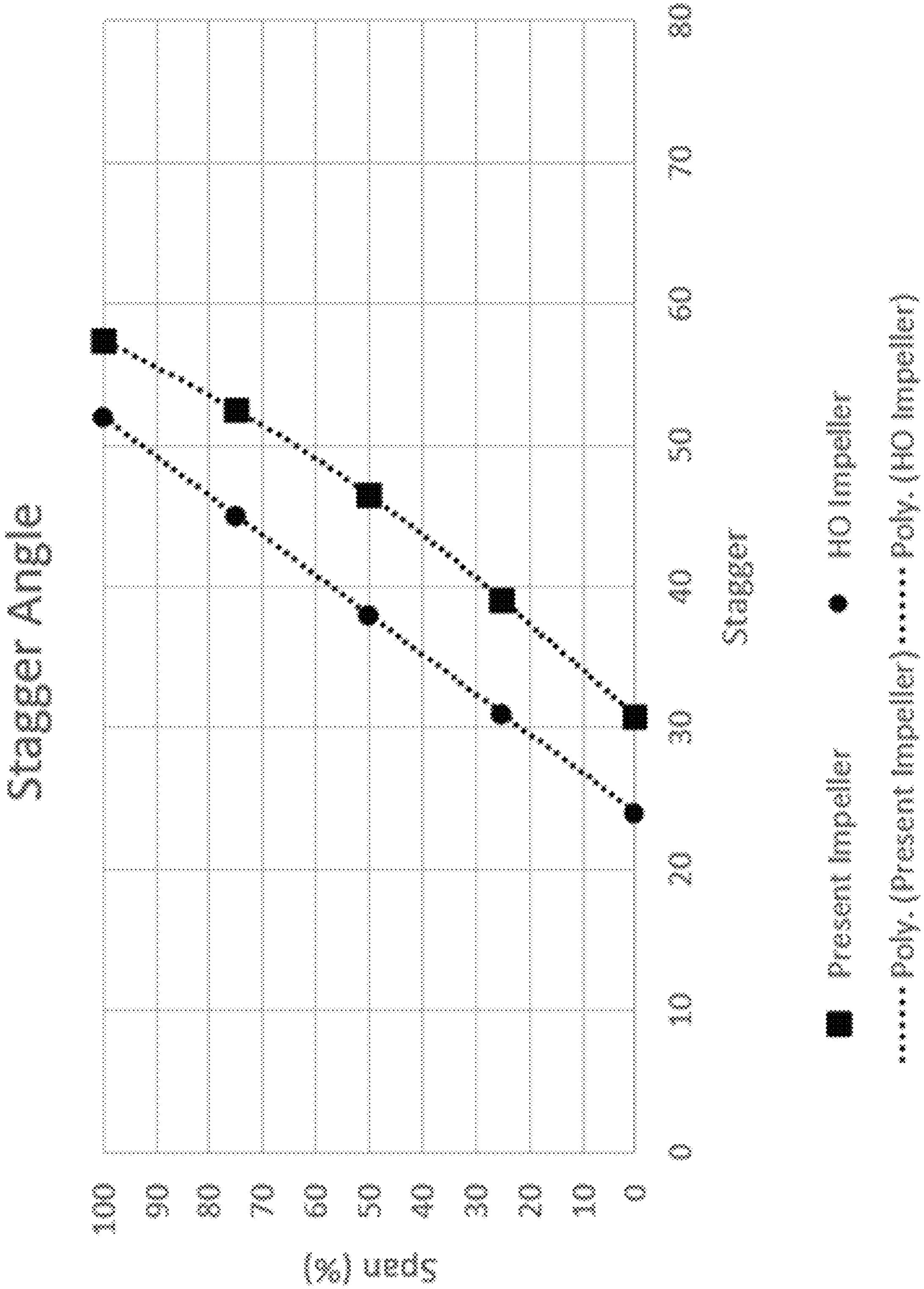
FIG. 25 shows a graph illustrating Blade Span (%) vs. Stagger Angle.

Referring to the graph of FIG. 25, the stagger angle increases from about 30 degrees at the root to about 55 to 60 degrees at the tip. Accordingly, the stagger angle is at least 20 degrees, and may be about 25 to 30 degrees greater than the tip relative to the root.

Figure 26:
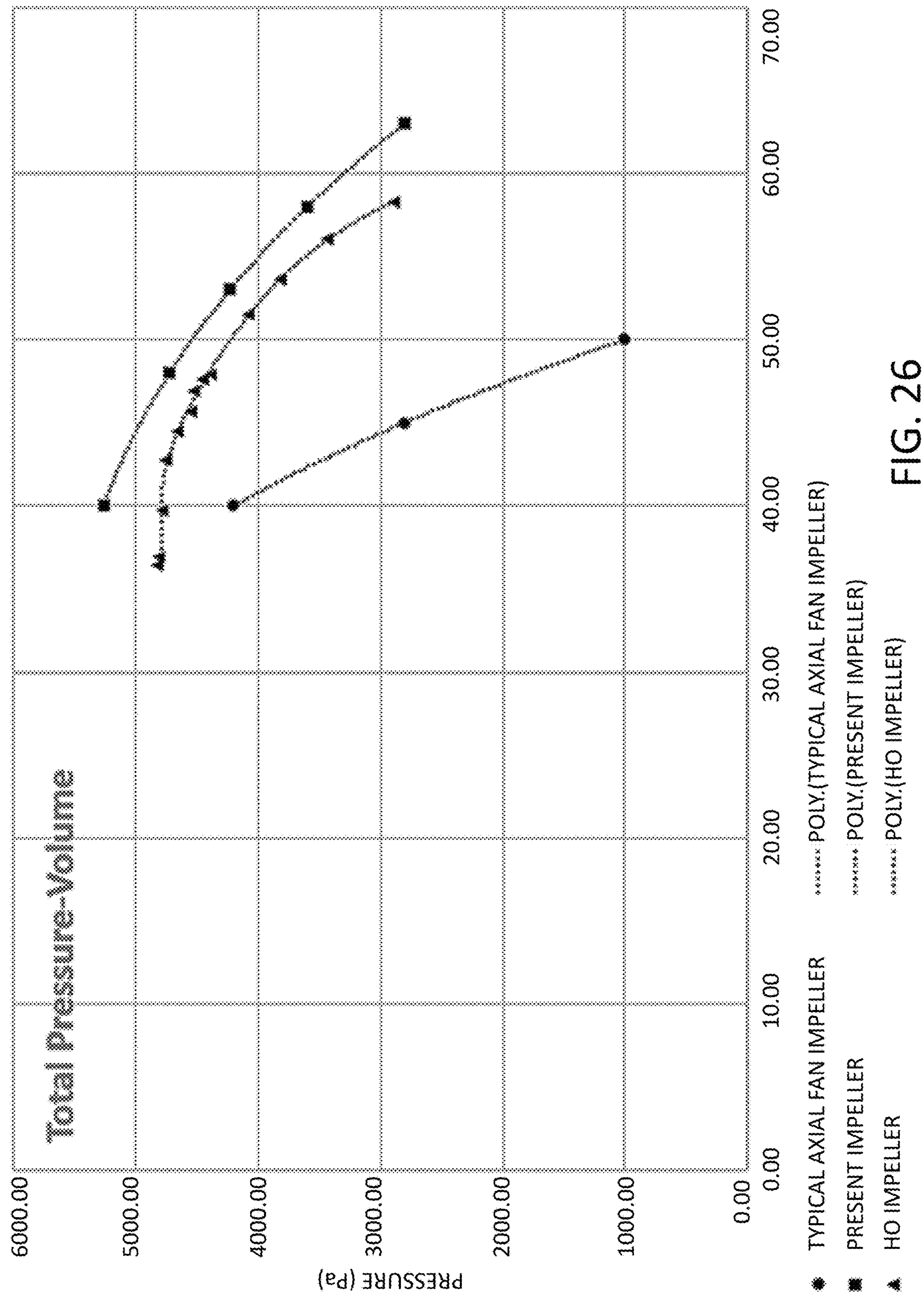
FIG. 26 shows a graph illustrating Pressure vs. Volume.
Figure 27:
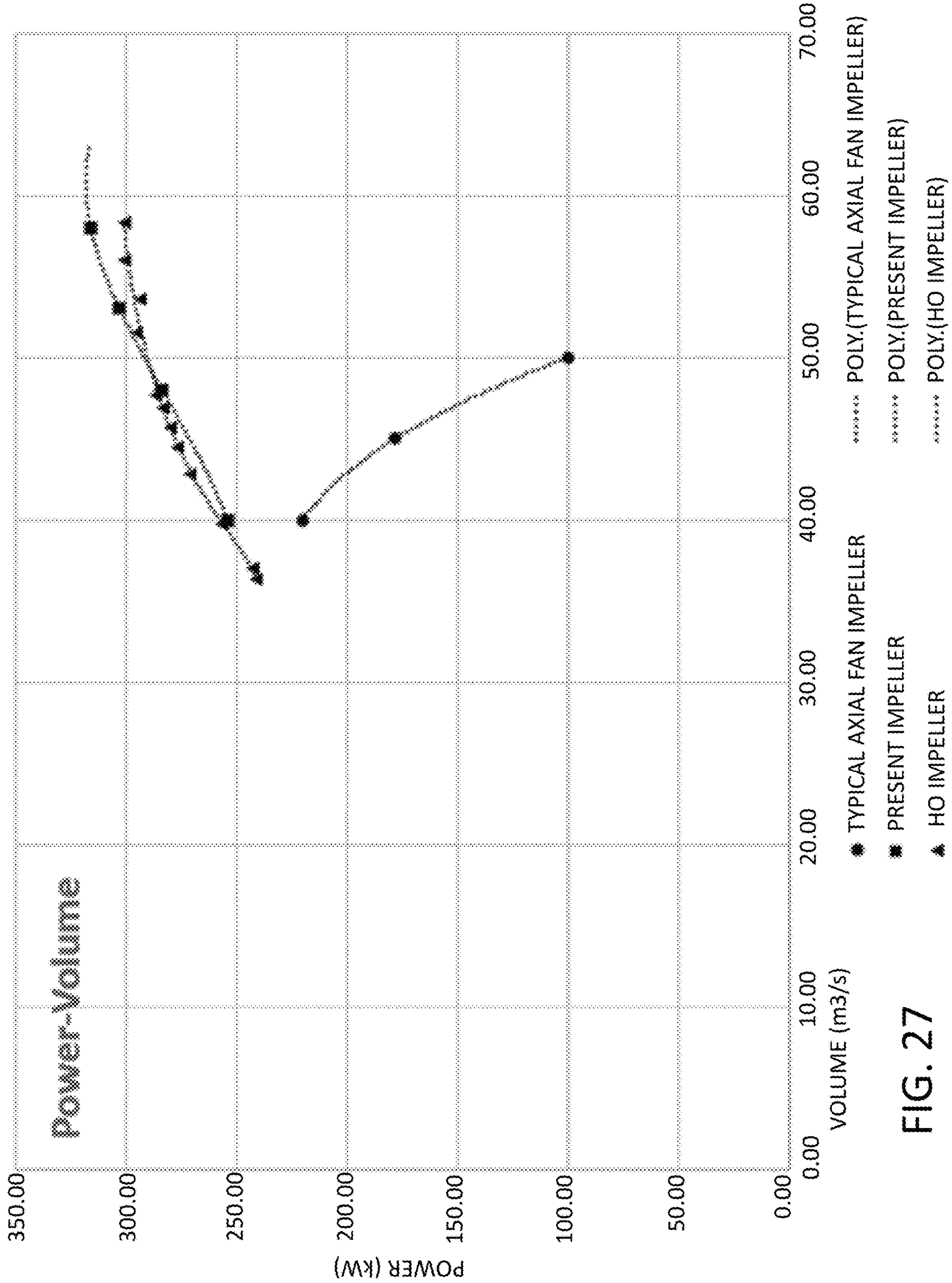
FIG. 27 shows a graph illustrating Power vs. Volume.
Figure 28:
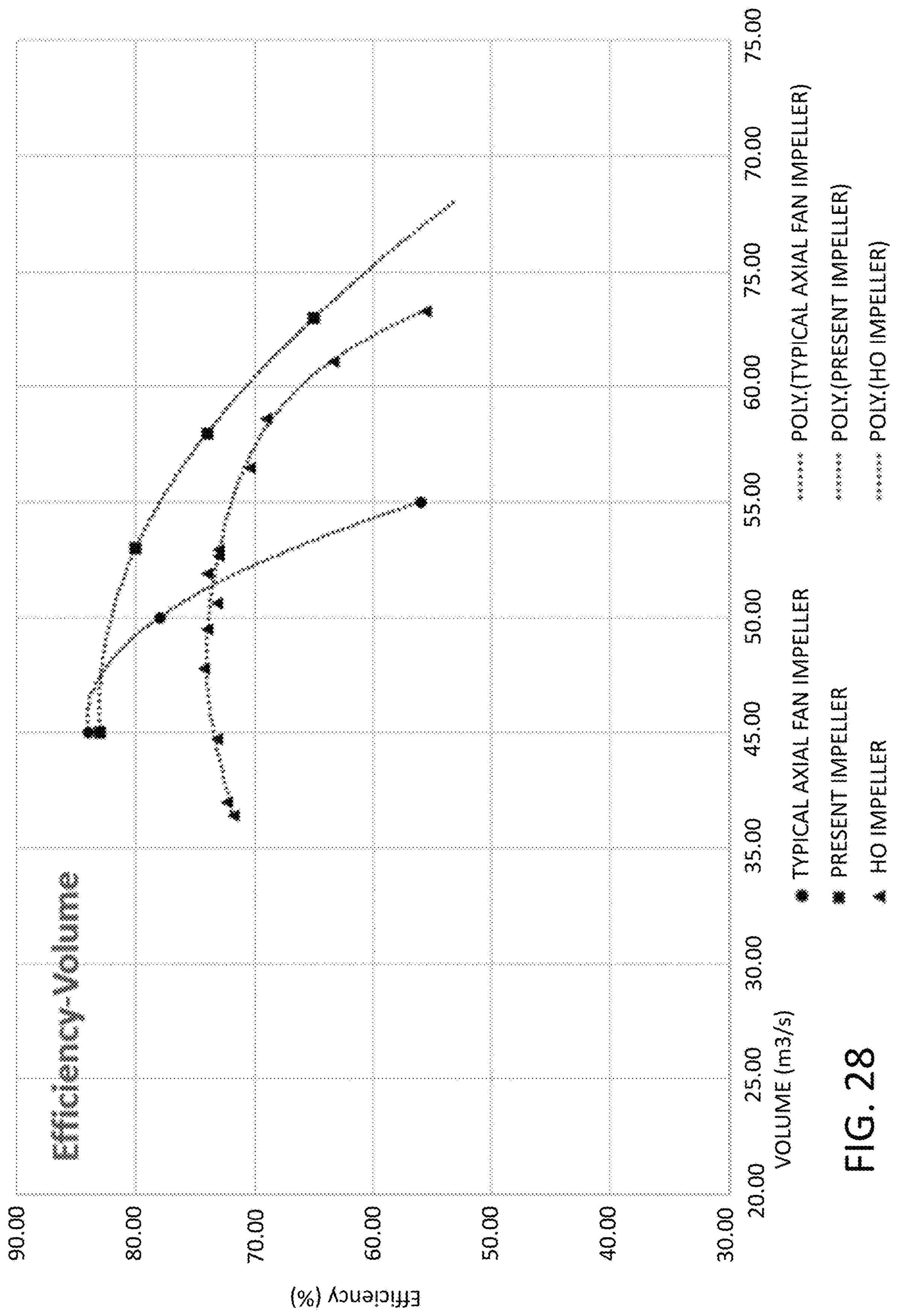
FIG. 28 shows a graph illustrating Efficiency vs. Volume.

Referring now to the graphs of FIGS. 26-28, these graphs respectively show the Pressure-Volume, Volume-Power and Efficiency Volume of the present impeller relative to the HO impeller and an example typical axial fan which has aerofoil type blades.

From the graph of FIG. 26, it may be observed that the present impeller generates an increased pressure relative to the HO impeller across similar volumetric flow rates and in the graph of FIG. 27, the subject impeller requires similar power to the HO impeller for a similar volumetric flow rate. In the graph of FIG. 27, it may be seen that efficiency for a given volumetric flow rate is higher for the present impeller across the entire range of operation, especially at lower volumetric flow rates thus providing a wider efficient operating window. The present impeller provides higher volumetric flow at the same pressure as the HO impeller due to the additional reaction of the present impeller characteristics.

Referring to FIGS. 12 to 15, there is shown a second example of a ducted fan arrangement 110 in which like sequences numerals denote like parts (i.e. 10, 110). The second example is similar to the first example and all parts are not again described here.

The ducted fan arrangement 110 includes duct body 112 with an inlet 114 and an outlet 116, a motor 118 supported by the duct body 112, an impeller 120, also known as a fan, driven by the motor 118 between the inlet 114 and the outlet 116 and a diffuser 122 supported by the duct body 112 between the impeller 120 and the outlet 116. The impeller 120 includes a hub 124 and a plurality of blades 126 extending radially from the hub 124, each of the plurality of blades including a root 128 proximate the hub 124 and a tip 130.

Figure 15:
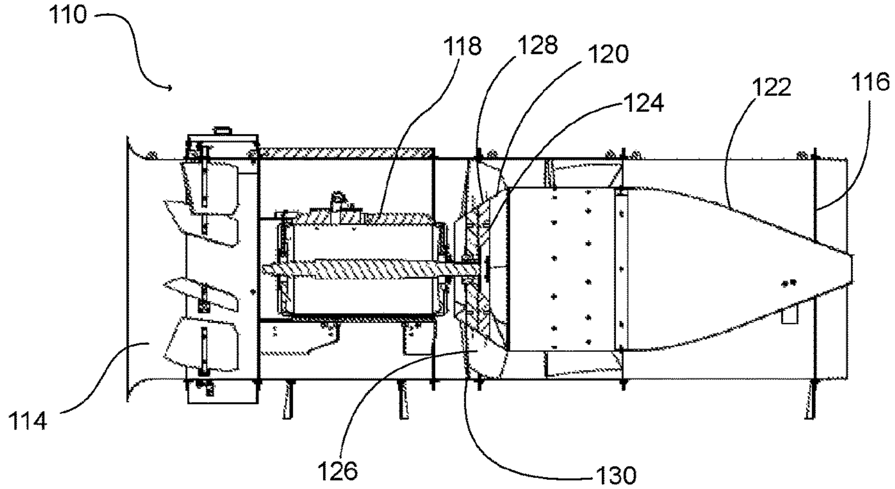
FIG. 15 is a side sectional view illustrating the second example of the ducted fan arrangement.

As best shown in FIG. 15, a taper of the hub 124 may be constant and in the range of about 10 to 40 degrees, and preferably, not limited to, about 30 to 35 degrees, the hub taper providing some compression to the airflow. The flow then proceeds past outlet vanes 154 to the outlet 116. The diffuser 122 provides a long taper and gradual expansion of the flow. The outlet guide vanes 154 may be aerofoil shaped and the diffuser 122 may be a single piece such as, but not limited to, a plastic rotomolded section.

Figure 16:
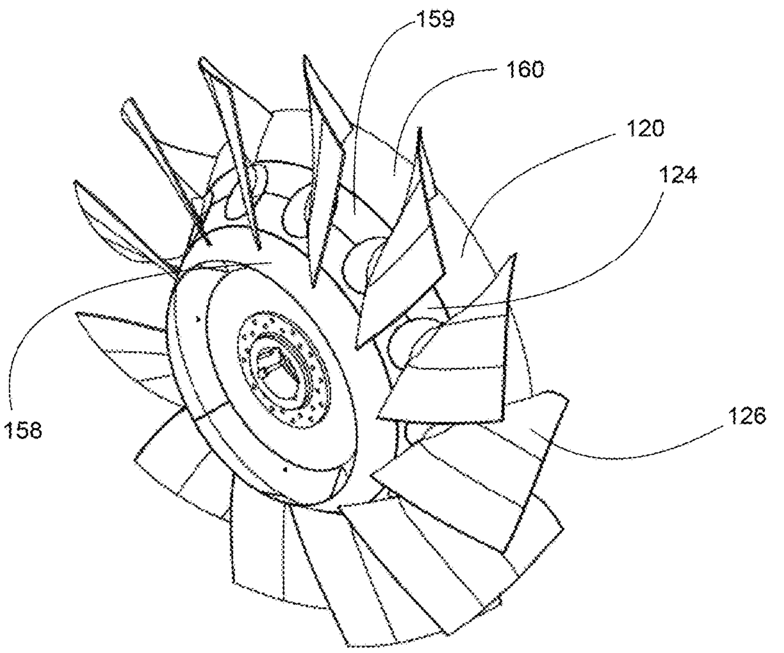
FIG. 16 is a front perspective view illustrating an impeller of the second example of the ducted fan arrangement.
Figure 17:
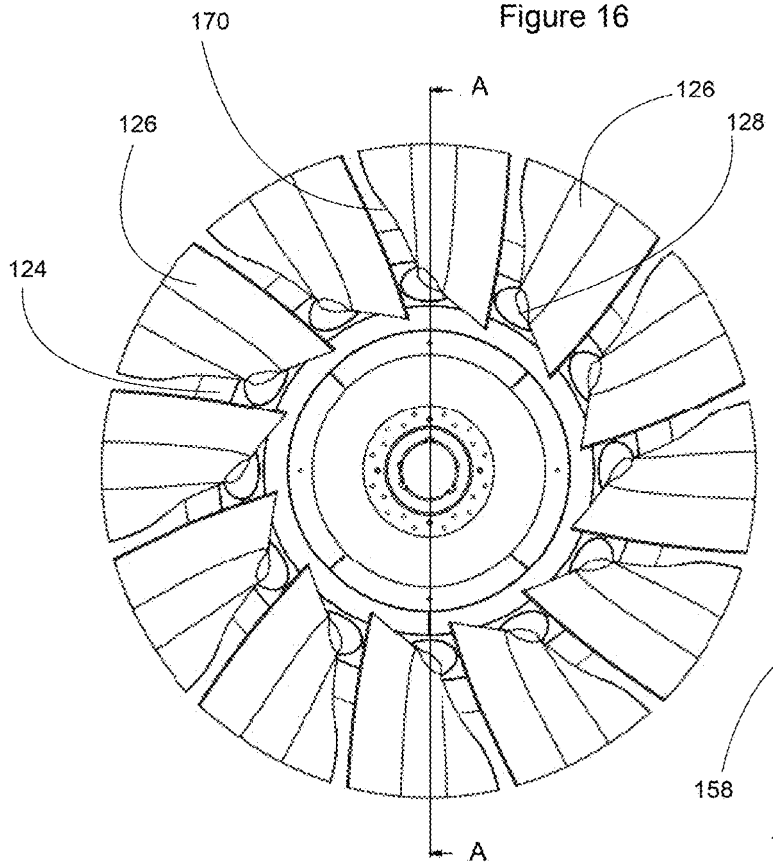
FIG. 17 is a front view illustrating the impeller.
Figure 18:
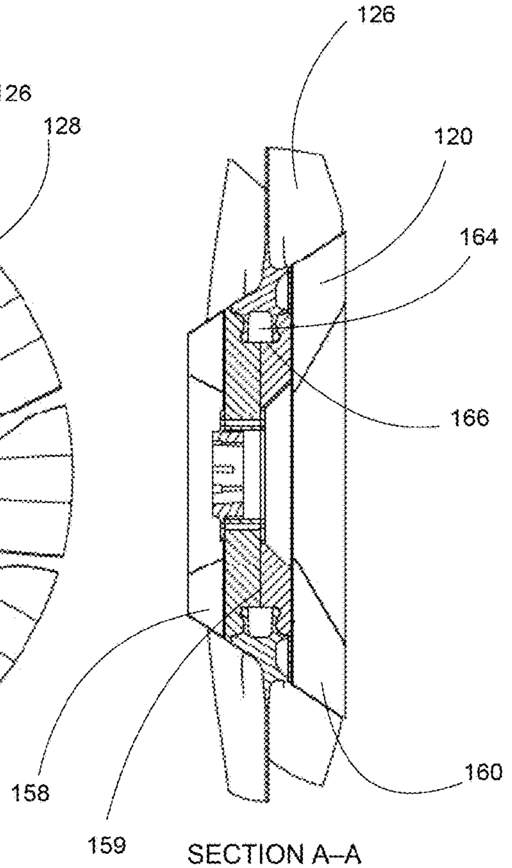
FIG. 18 is a side view illustrating the impeller.

Referring now to FIGS. 16 to 18, the impeller 120 is shown in more detail. The hub 124 includes a forward hub section 158, an intermediate hub section 159 to which the plurality of blades 126 are radially coupled, and a rear hub section 160 that together are generally frustoconical in shape to provide the taper. The plurality of blades 126 each include blade sections 162 and coupling sections 164 that fit with sockets 166 of the intermediate hub section 159.

The coupling sections 164 may have a generally cylindrical body 165 with a head 161 and a narrower waist 163 that may be retained or locked within the intermediate hub section 159. The root 128 of the blade 126 extends forward of the coupling section 164 to the leading edge 168 and the root 128 extends rearward of the coupling section 164 the trailing edge 170. The coupling section 164 thereby being generally intermediate the root 128 with the root 128 of the blade 126 being shaped to meet with the continuous taper of the hub 124.

It is noted that in this second example, the forward hub section 158, the intermediate hub section 159 and the rear hub section 160 are arranged to provide a generally continuous taper against which the blades 126 fit to extending against and across the forward hub section 158, the intermediate hub section 159 and the rear hub section 160. This allows the blade 126 to have camber angles freer of constraints relating to the connection to the hub 124, and also allows pivotal movement of the blade 126 to adjust the pitch whilst the root 128 is fitted with the taper of the hub 124.

Figure 19:
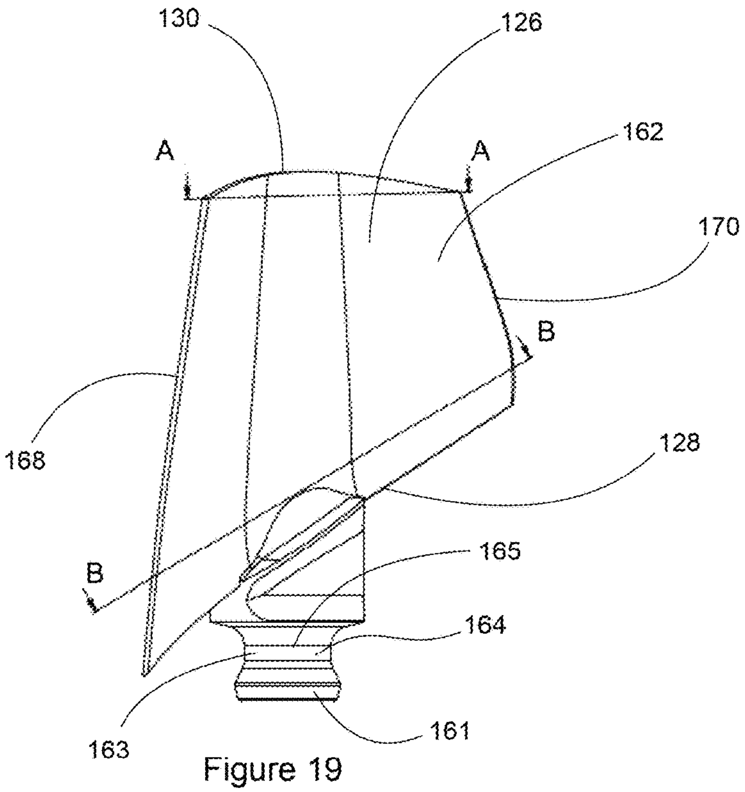
FIG. 19 is a side view illustrating a blade of the second example of the impeller.

The coupling sections 164, best shown in FIG. 19, may be fitted to the sockets 166 to enable variation of the pitch during installation and then fixed once the pitch is set. The arrangement of coupling sections 164 and sockets 166 also allow for blades 126 to added and removed, which in combination with pitch may change the solidity ratio. The process to maintain and adjust blade 126 pitch is also simplified. In some examples, the blades 126 may be fixed in place such as by welding once set in place.

Figure 20:
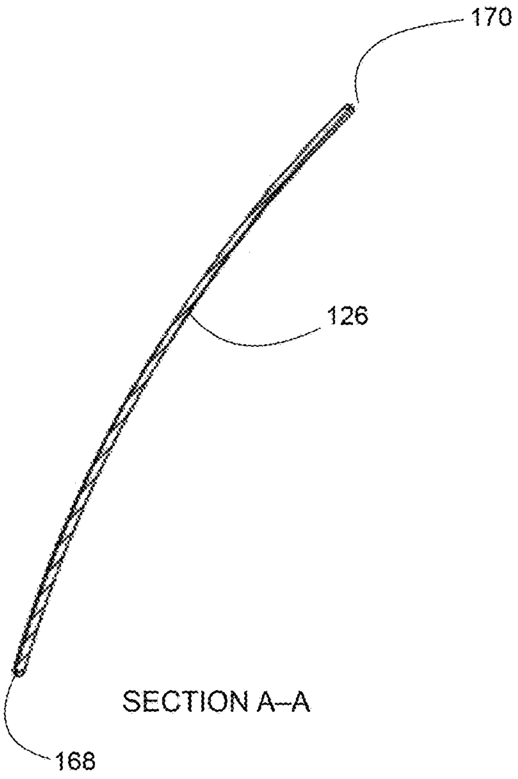
FIG. 20 is a sectional view illustrating section A-A of the blade shown in FIG. 19.
Figure 21:
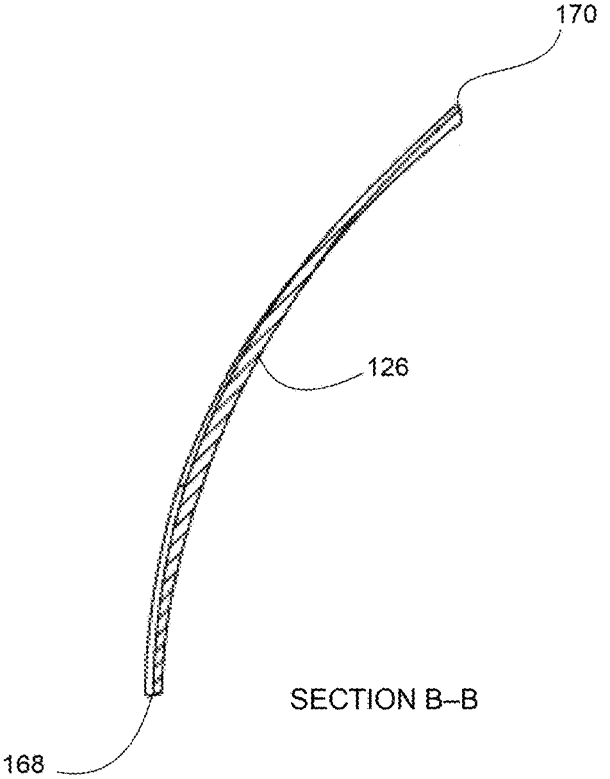
FIG. 21 is a sectional view illustrating section B-B of the blade shown in FIG. 19.
Figure 29:
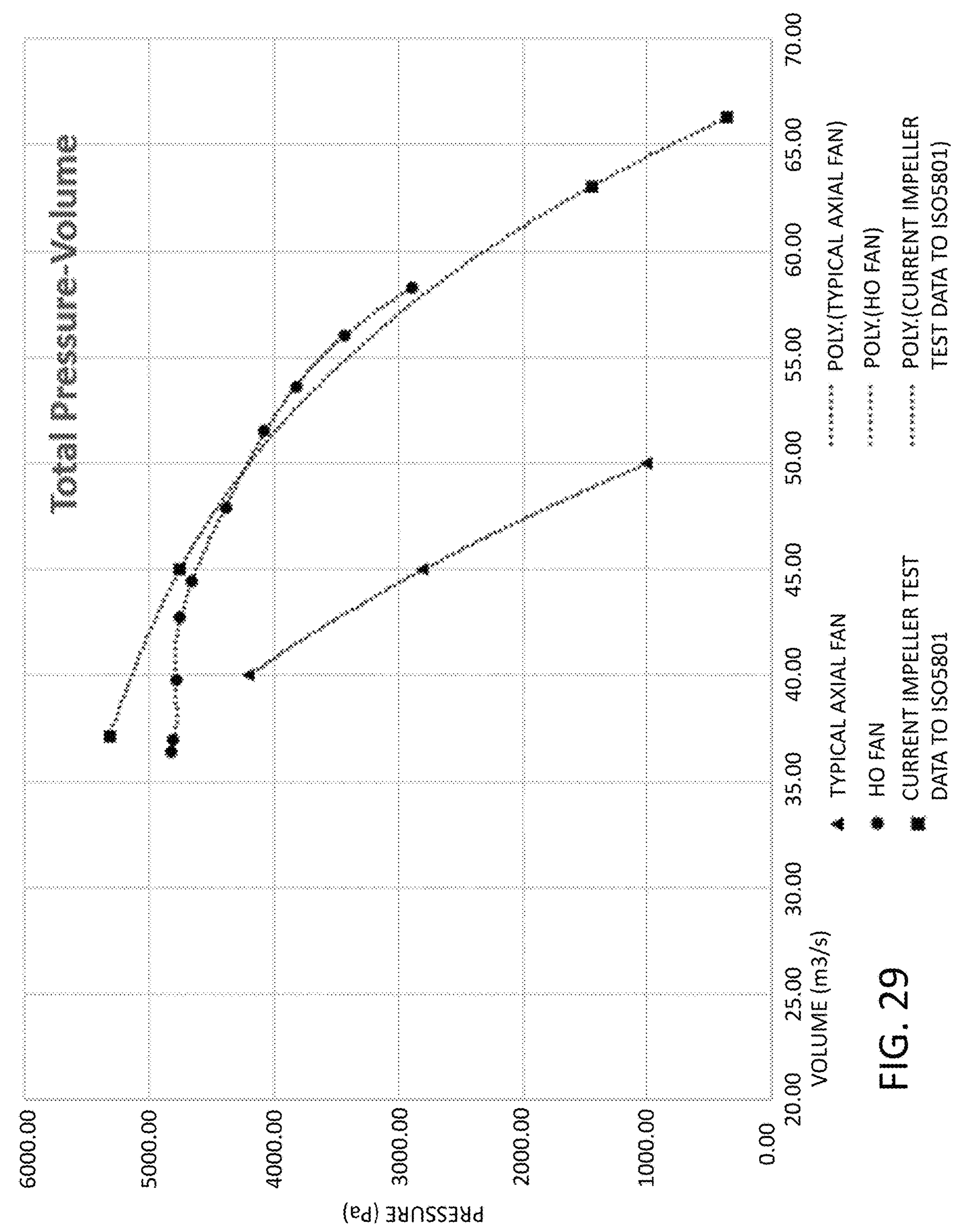
FIG. 29 shows a graph illustrating Pressure vs. Volume, for a second example.
Figure 30:
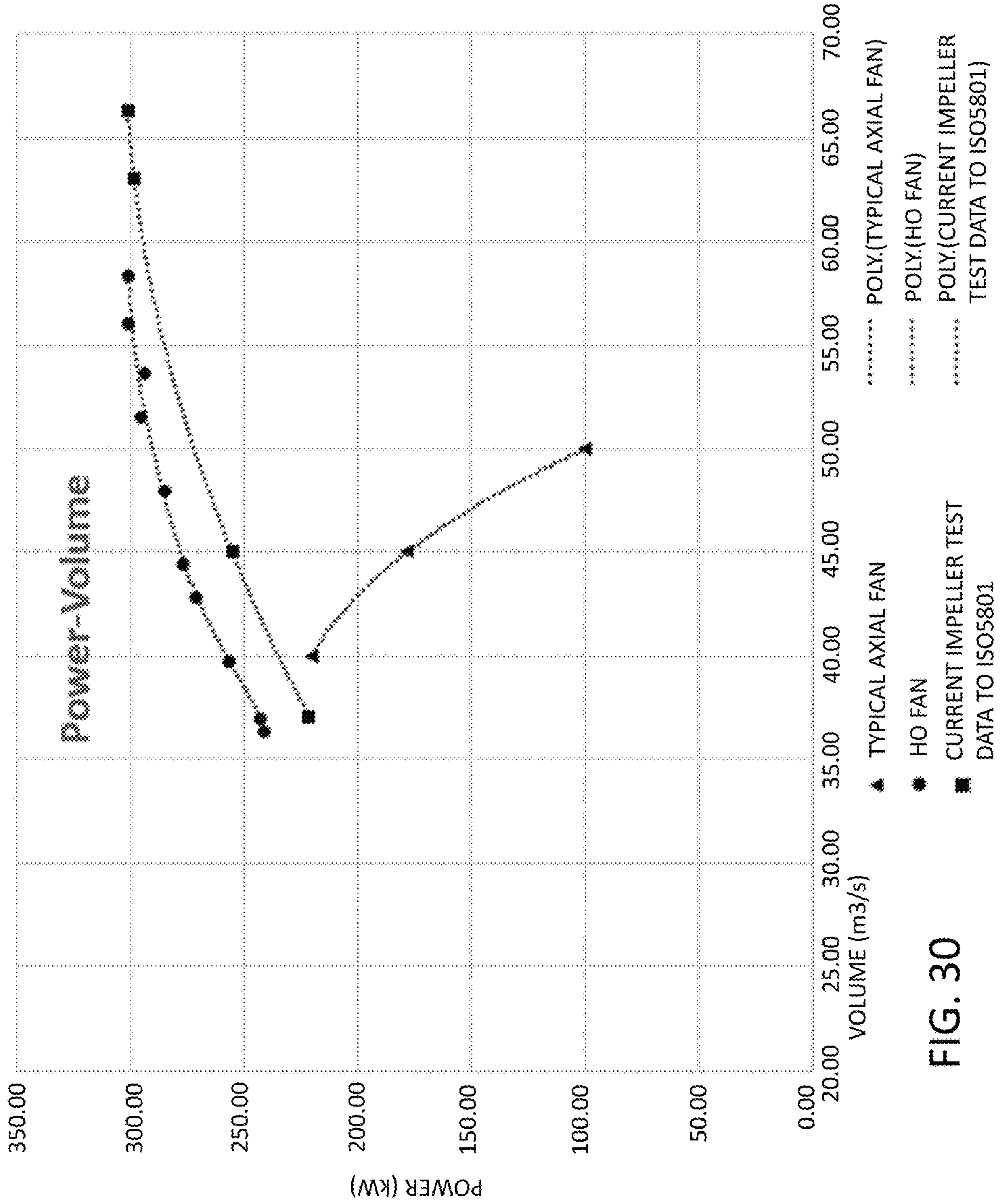
FIG. 30 shows a graph illustrating Power vs. Volume, for the second example.
Figure 31:
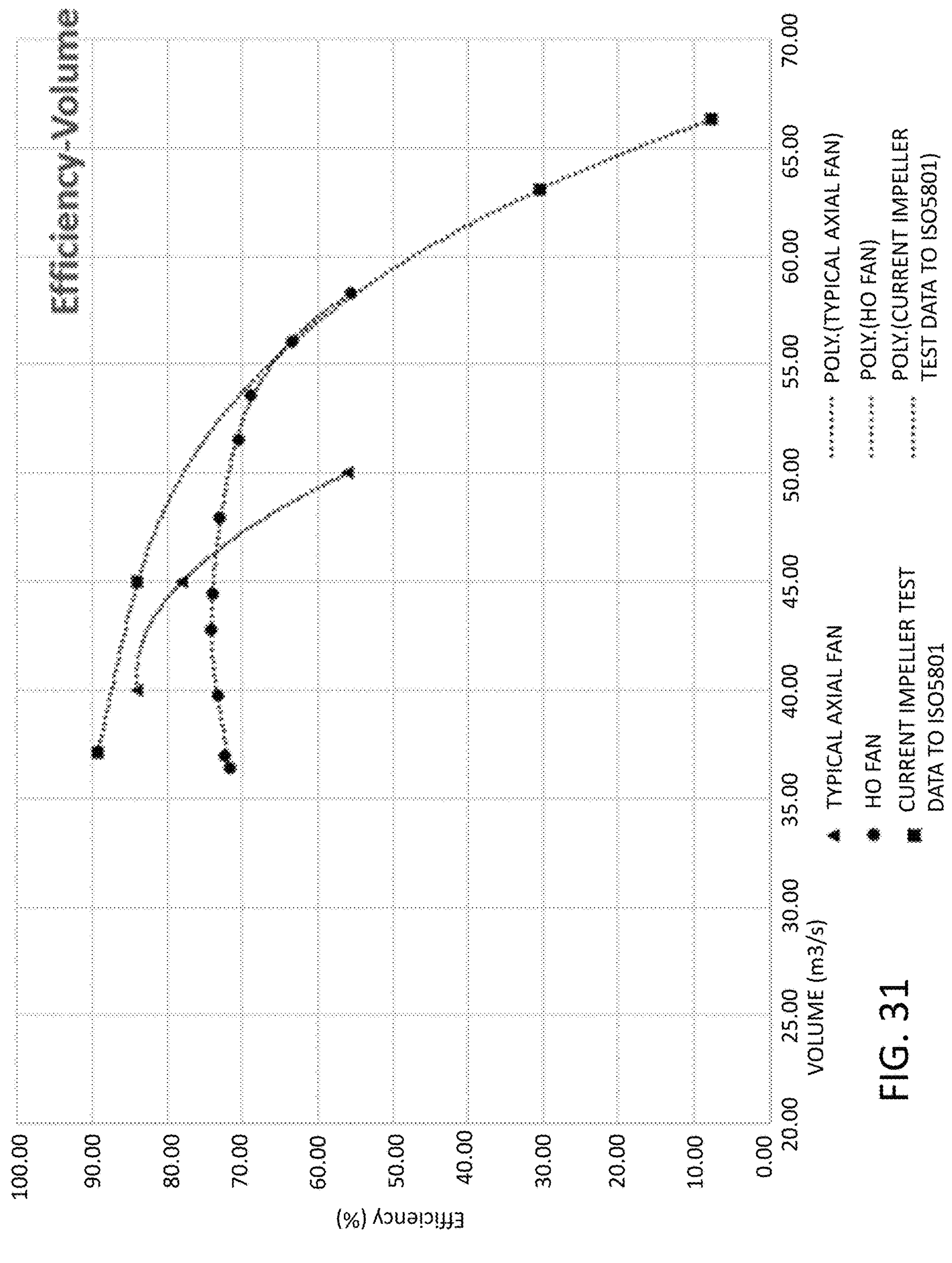
FIG. 31 shows a graph illustrating Efficiency vs. Volume, for the second example.

Turning to the blades 126 in more detail and referred to FIGS. 19 to 21, in this example the shape of the blades 126 are similar to the first example, and Table 1 provides an example of parameters for each of the first and second examples which relate to the results shown in the graphs of FIGS. 26-28 for the first example and the graphs of FIGS. 29-31 for the second example.

Differences of note between the first example and the second example include the blade chord being reduced, and the camber and stagger angles at the root being increased to carry the shape of the blade to the root. The attachment to the hub 124 has also been altered to improve strength and a straight section on the impeller 126 has been removed to improve performance of the impeller when its pitch is varied. The hub 124 now has a continuous taper and the coupling sections 164 are intermediate the root 128 rather than toward to leading edge 168 as per the first example.

TABLE 1

Example Impeller Parameters for the First Example and the Second Example.

| | Parameter | | | | | | | | | |
|---|---|---|---|---|---|---|---|---|---|---|
| UoM | Impeller diameter mm | Hub inlet mm | Hub outlet mm | Hub taper angle deg | Number of blades — | Blade chord mm | Camber at root deg | Camber at tip deg | Stagger at root deg | Stagger at tip deg |
| First Example Impeller | 1385 | Ø600 | Ø1040 | 33.4 | 12 | 380 | 53.95° | 28.75° | 30.75° | 57.37° |
| Second Example (Test Impeller) | 1385 | Ø600 | Ø1033 | 33.3 | 12 | 370 | 56.8° | 29.5° | 34° | 56.4° |

Referring now to the graphs of FIGS. 29-31, these graphs respectively show experimental results including the Pressure-Volume, Power-Volume and Efficiency-Volume of the present second example of the impeller relative to the HO impeller and an example typical axial fan which has aerofoil type blades.

From the graph of FIG. 29, it may be observed that the second example impeller (referenced as "Current Impeller Test data" in the Graphs) generates an increased pressure relative to the HO impeller across similar volumetric flow rates and in the graph of FIG. 30, the second example impeller requires similar power to the HO impeller for a similar volumetric flow rate.

In the graph of FIG. 31, similarly to the first example, it may be seen that efficiency for a given volumetric flow rate is higher for the present (second example) impeller across the entire range of operation, especially at lower volumetric flow rates thus providing a wider efficient operating window. Like the first example, the second example of the impeller provides higher volumetric flow at the same pressure as the HO impeller due to the additional reaction of the impeller characteristics.

It is understood that the primary parameters that assist with the higher peak efficiency include the relatively large camber angles (i.e. large air angle deviation, imparting maximum velocity increase without separation on the blade) and the hub having a now generally continuous taper to increase flow velocity effectively without static pressure generation across the impeller. Secondary aspects that assist with the higher efficiency include the efficient, well designed airpath with the inlet, straightener vanes, diffuser, larger flow annulus all contributing.

Figure 32:
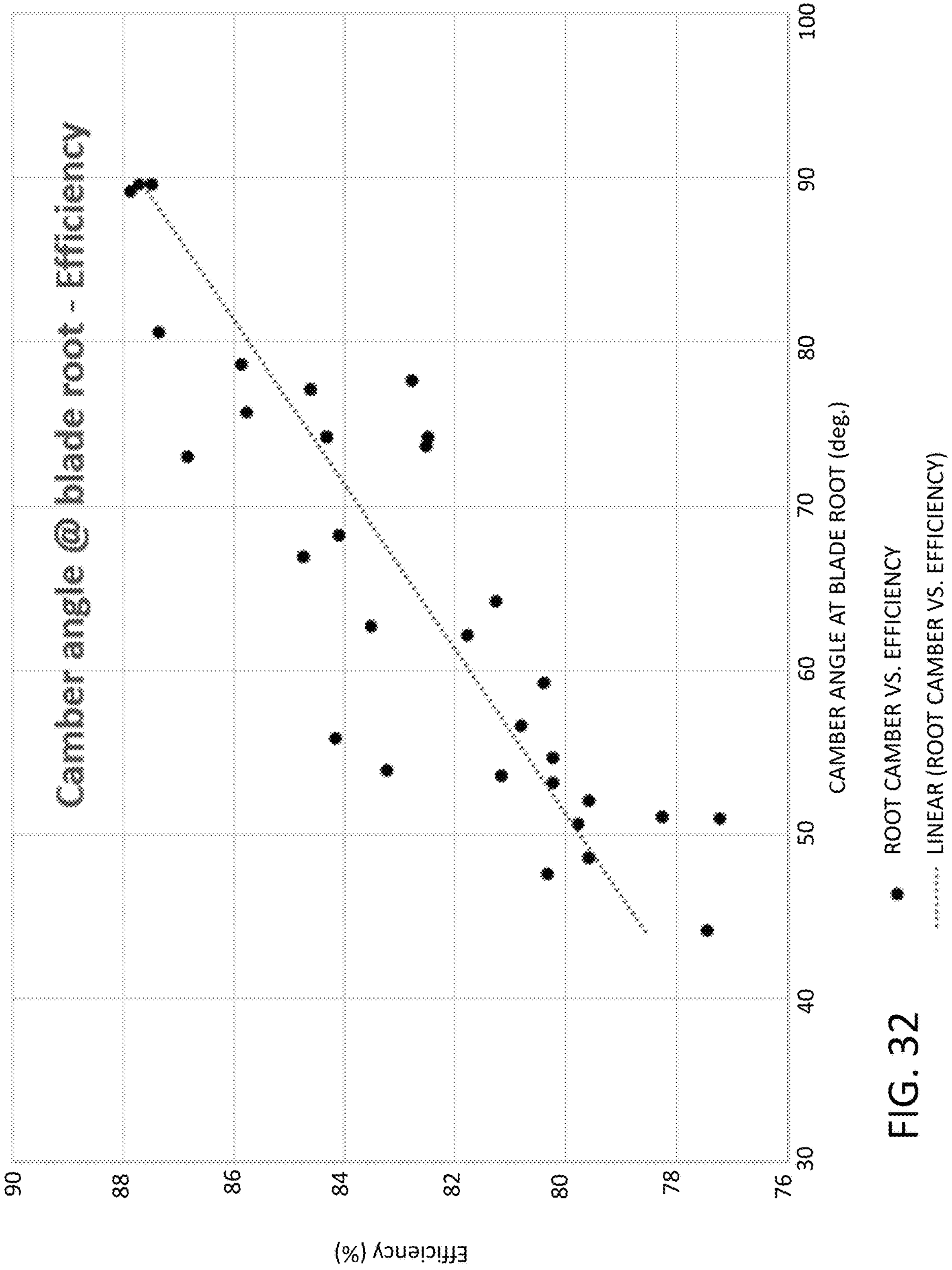
FIG. 32 shows a graph illustrating Efficiency vs. Camber Angle at Blade Root.
Figure 33:
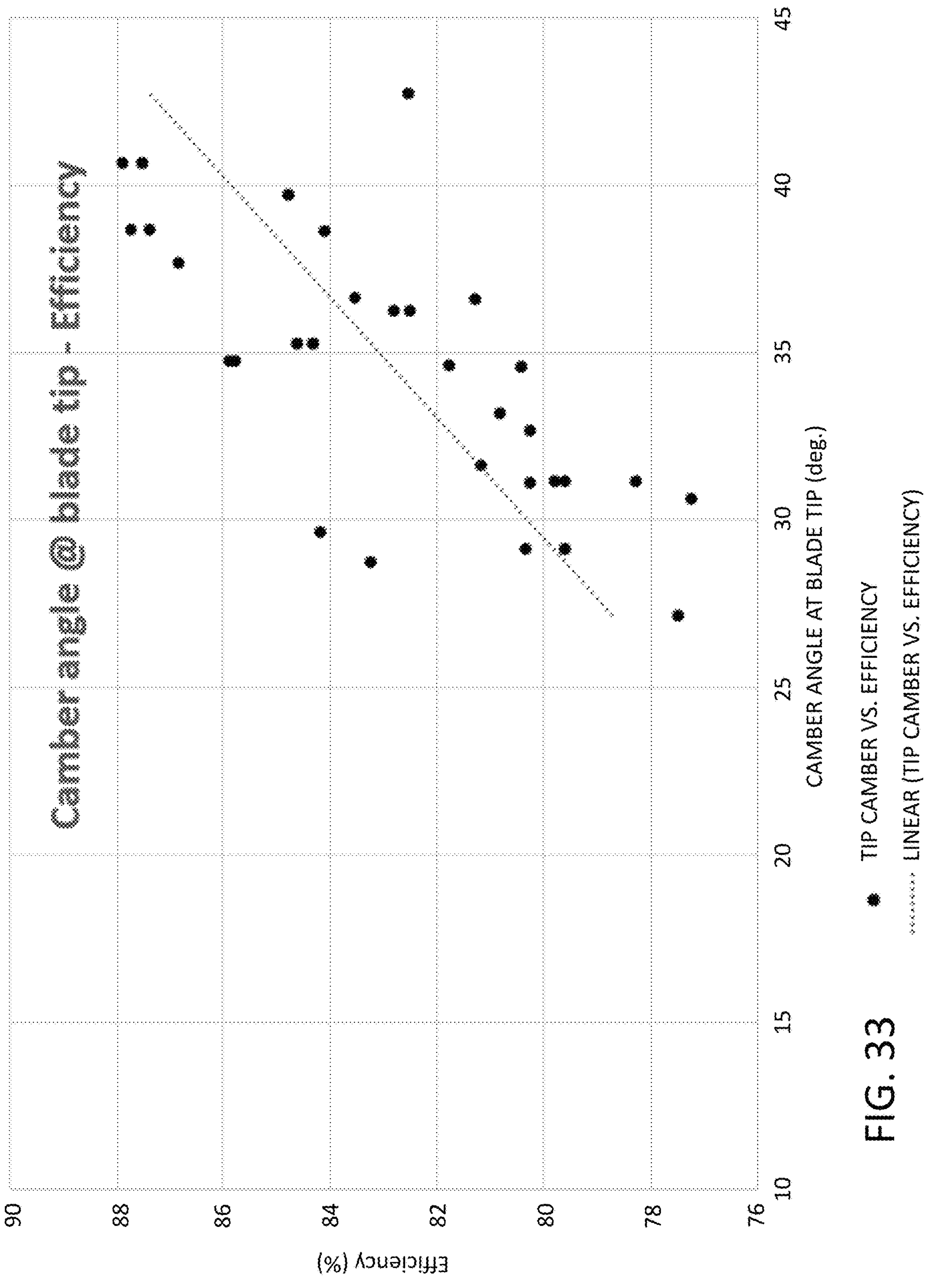
FIG. 33 shows a graph illustrating Efficiency vs. Camber Angle at Blade Tip.

Referring to the graphs of FIGS. 32-33, the efficiency at various camber angles is shown for the root and tip, respectively. It may be seen that generally efficiency increases with an increasing camber angle, noting that generally for similar efficiencies the camber angle at the tip is in the range of at least about 15 to 50 degrees less than the root for similar efficiencies. It is noted that typically blades may flatten or open up from root toward the tip due the increased rotational velocity to keep the same impulse ratio. However, in this example, blades 126 are opened up even further, decreasing the impulse ratio below 1, to take advantage of both or a blend of impulse and pressure driven flow near the tip ensuring the blade 126 does the maximum amount of work possible, improving the overall efficiency.

Advantageously, there has been provided a ducted fan arrangement including an impeller with blades adapted to provide a composite or blend of impulse and reaction functionality at relatively low Mach numbers, being generally incompressible flow. These blade characteristics have been found to provide an improved efficiency in comparison to a similar impulse fan, and also improved performance in comparison of fans that with either flat bladed impulse fans or axial fans with aerofoil blades. Further, due to the blend of impulse and reaction functionality the impeller has a relatively wide performance operating envelope where the performance is high, and the efficiency is high.

Throughout this specification and the claims which follow, unless the context requires otherwise, the word “comprise”, and variations such as “comprises” and “comprising”, will be understood to imply the inclusion of a stated integer or step or group of integers or steps but not the exclusion of any other integer or step or group of integers or steps.

The reference in this specification to any known matter or any prior publication is not, and should not be taken to be, an acknowledgment or admission or suggestion that the known matter or prior art publication forms part of the common general knowledge in the field to which this specification relates.

While specific examples of the invention have been described, it will be understood that the invention extends to alternative combinations of the features disclosed or evident from the disclosure provided herein.

Many and various modifications will be apparent to those skilled in the art without departing from the scope of the invention disclosed or evident from the disclosure provided herein.

What is claimed is:

1. An impeller for a ducted fan arrangement, the impeller including a hub which is tapered to compress airflow and a plurality of blades extending radially from the hub, each of the plurality of blades including a root proximate the hub and a tip, wherein a camber of each of the plurality of blades is arranged to continuously flatten between the root and the tip so as to provide an impulse driven flow toward the hub and transition relatively toward a pressure driven flow toward the tip, wherein a tip camber at the tip of each of the plurality of blades is at least in the range of 15 to 50 degrees less than a root camber at the root of the blade, and wherein an impulse ratio at the tip is at least 10% less than an impulse ratio at the hub.

2. The impeller according to claim 1, wherein the tip camber at the tip of each of the plurality of blades is at least 35% to 60% less than the root camber at the root of the blade.

3. The impeller according to claim 2, wherein the tip camber is the range of 25 to 35 degrees and the root camber is in the range of 50 to 60 degrees.

4. The impeller according to claim 1, wherein the impulse ratio at the hub is greater than 0.9.

5. The impeller according to claim 4, wherein the impulse ratio at the tip is less than 0.85.

6. The impeller according to claim 1, wherein the solidity of the impeller decreases between the hub and the tip from a solidity greater than 1.75 at the hub to a solidity less than 1.7 at the tip.

7. The impeller according to claim 1, wherein the solidity of the impeller deceases between the hub and the tip from a solidity greater than 2 at the hub to a solidity less than 1.5 at the tip.

8. The impeller according to claim 1, wherein a tip solidity of the impeller is 0.5 to 0.75 of a hub solidity of the impeller.

9. The impeller according to claim 1, wherein a stagger angle increases from the hub toward the tip.

10. The impeller according to claim 9, wherein the stagger angle at the tip is at least 20 degrees greater than the stagger angle at the root.

11. The impeller according to claim 9, wherein the stagger angle at the hub is less than 40 degrees and the stagger angle at the tip is greater than 50 degrees.

12. The impeller according to claim 1, wherein each of the plurality of blades is a flat plate or non-aerofoil section.

13. The impeller according to claim 1, wherein the each of the plurality of blades has an aerofoil shaped cross section.

14. The impeller according to claim 1, wherein the taper of the hub has a constant taper along the root of each of the plurality of blades.

15. The impeller according to claim 1, wherein each of the plurality of blades is pivotally coupled to the hub.

16. The impeller according to claim 1, wherein each of the plurality of blades includes a coupling that is received by a socket of the hub.

17. The impeller according to claim 15, wherein the impeller includes a pitch adjustment mechanism adapted to pivotally couple each of the plurality of blades with the hub.

18. The impeller according to claim 1, wherein the impeller operates with flows having a Mach number less than 0.3.

19. The impeller according to claim 1, wherein the hub has a constant taper along the root of each of the plurality of blades, and wherein each of the plurality of blades includes a coupling that is received by a socket of the hub to allow pivotal adjustment between the each of the plurality of blades with the root of each of the plurality of blades being adjacent to the constant taper of the hub.

20. A ducted fan arrangement including:

a duct body with an inlet and an outlet;

a motor supported by the duct body;

an impeller driven by the motor between the inlet and the outlet; and a diffuser supported by the duct body between impeller and the outlet, wherein the impeller includes a hub which is tapered to compress airflow coupled to the motor and a plurality of blades extending radially from the hub, each of the plurality of blades including a root proximate the hub and a tip, wherein a camber of each of the plurality of blades is arranged to continuously flatten between the root and the tip to provide an impulse driven flow toward the hub and transition toward a pressure driven flow toward the tip, and wherein a tip camber at the tip of each of the plurality of blades is at least in the range of 15 to 50 degrees less than a root camber at the root of the blade, and wherein an impulse ratio at the tip is at least 10% less than an impulse ratio at the hub.

21. The ducted fan arrangement according to claim 20, wherein the hub has a constant taper along the root of each of the plurality of blades.

22. The ducted fan arrangement according to claim 21, wherein each of the plurality of blades includes a coupling that is received by a socket of the hub to allow pivotal adjustment between each of the plurality of blades with the root of each of the plurality of blades being adjacent to the constant taper of the hub.

23. The ducted fan arrangement according to claim 20, wherein the impulse ratio at the hub is greater than 0.9.

24. The ducted fan arrangement according to claim 23, wherein the impulse ratio at the tip is less than 0.85.

25. The ducted fan arrangement according to claim 20, wherein the motor is located relatively upstream of the impeller.

* * * * *